US011706157B2

(12) United States Patent
Zhao

(10) Patent No.: US 11,706,157 B2
(45) Date of Patent: *Jul. 18, 2023

(54) TIME-SPACED MESSAGING FOR FACILITATING NETWORK COMMUNICATIONS

(71) Applicant: AT&T Intellectual Property I, L.P., Atlanta, GA (US)

(72) Inventor: Xiaoming Zhao, Plano, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,815

(22) Filed: Dec. 17, 2021

(65) Prior Publication Data

US 2022/0116338 A1 Apr. 14, 2022

Related U.S. Application Data

(63) Continuation of application No. 16/108,074, filed on Aug. 21, 2018, now Pat. No. 11,240,176.

(51) Int. Cl.
*H04L 47/70* (2022.01)
*H04L 43/0894* (2022.01)
(Continued)

(52) U.S. Cl.
CPC ........ *H04L 47/826* (2013.01); *H04L 43/0858* (2013.01); *H04L 43/0894* (2013.01); *H04L 47/283* (2013.01)

(58) Field of Classification Search
CPC ............... H04L 47/826; H04L 43/0858; H04L 43/0894; H04L 47/283; H04L 43/16; H04L 43/20
See application file for complete search history.

(56) References Cited

U.S. PATENT DOCUMENTS 5,313,454 A 5/1994 Bustini et al.
6,377,545 B1 4/2002 Onyiagha
(Continued)

FOREIGN PATENT DOCUMENTS

AU 616509 B2 10/1991
AU 2005207351 A1 8/2005
(Continued)

OTHER PUBLICATIONS

Non Final office action received for U.S. Appl. No. 16/108,074 dated Apr. 15, 2021, 40 pages.
(Continued)

*Primary Examiner* — Mandish K Randhawa
(74) *Attorney, Agent, or Firm* — Amin, Turocy & Watson, LLP

(57) ABSTRACT

Time-spaced messaging for network communications is facilitated. An example method may include receiving a plurality of messages at a message rate. The method may further include determining a number of the plurality of messages a network device is unable to process. The method may further include determining, based on the number, a miss rate associated with the plurality of messages. The method may further include determining whether the miss rate exceeds a threshold miss rate and, if the miss rate is determined to exceed the threshold miss rate, determining a time delay based on the miss rate and message rate, and applying the first time delay to at least one message received subsequent to the plurality of messages.

20 Claims, 10 Drawing Sheets

(51) Int. Cl.
    *H04L 47/283*     (2022.01)
    *H04L 43/0852*     (2022.01)

(56) References Cited

U.S. PATENT DOCUMENTS

| | | | |
|---|---|---|---|
| 6,377,548 | B1 | 4/2002 | Chuah |
| 6,608,832 | B2 | 8/2003 | Forslow |
| 6,965,597 | B1 | 11/2005 | Conway |
| 6,970,422 | B1 | 11/2005 | Ho et al. |
| 7,369,498 | B1 | 5/2008 | Ma et al. |
| 7,379,705 | B1 | 5/2008 | Rados et al. |
| 7,450,504 | B1 | 11/2008 | Ho et al. |
| 7,542,416 | B2 | 6/2009 | Benmohamed et al. |
| 7,596,644 | B2 | 9/2009 | Yu et al. |
| 7,668,096 | B2 | 2/2010 | Ignatowski et al. |
| 7,826,351 | B2 | 11/2010 | Rodriquez et al. |
| 8,559,908 | B2 | 10/2013 | Sun et al. |
| 8,660,427 | B2 | 2/2014 | Ovadia |
| 11,240,176 | B2 * | 2/2022 | Zhao .................... H04L 47/283 |
| 2017/0012861 | A1 | 1/2017 | Bluementhal et al. |

FOREIGN PATENT DOCUMENTS

| | | |
|---|---|---|
| CA | 2691589 A1 | 3/2006 |
| CN | 1685661 A | 2/2013 |

OTHER PUBLICATIONS

Gu et al., "Algorithms for Effective Variable Bit Rate Traffic Smoothing," IEEE International Performance, Computing, and Communications Conference, Apr. 9-11, 2003, pp. 387-394.

Mittal et al., "TIMELY: RTT-based Congestion Control for the Datacenter," SIGCOMM'15, Aug. 17-21, 2015, pp. 537-550.

Monrad, Atle, "Modules for Machine-to-Machine Communication in GPRS," May 2001, pp. 1-55.

"Queue-Based Load Leveling pattern," Microsoft Docs, Jun. 22, 2017, 7 Pages [online], retrieved on Aug. 21, 2018. Retrieved from the internet: <https://docs.microsoft.com/enus/azure/architecture/patterns/queue-based-load-levelina>.

Rajan et al., "Delay-Bounded Packet Scheduling of Bursty Traffic Over Wireless Channels," IEEE Transactions on Information Theory, vol. 50, No. 1, Jan. 30, 2004, pp. 125-144.

"Throttling pattern," Microsoft Docs, Jun. 22, 2017, 8 Pages [online], retrieved on Aug. 21, 2018. Retrieved from the Internet: <https://docs.microsoft.com/en-us/azure/architecture/patterns/throttlinq>.

Wang et al., "Delay-Power Tradeoff of Fixed-Rate Wireless Transmission With Arbitrarily Bursty Traffics," IEEE Access, Dec. 29, 2016, pp. 1668-1681.

Wang, Jinfu, "Management of Temporally and Spatially Correlated Failures in Federated Message Oriented Middleware for Resilient and QoS-Aware Messaging Services," Apr. 2015, pp. 1-141, Queen Mary University of London.

\* cited by examiner

TIME-SPACED MESSAGING FOR FACILITATING NETWORK COMMUNICATIONS

RELATED APPLICATION

The subject patent application is a continuation of, and claims priority to, U.S. patent application Ser. No. 16/108,074 (now U.S. Pat. No. 11,240,176), filed Aug. 21, 2018, and entitled "TIME-SPACED MESSAGING FOR FACILITATING NETWORK COMMUNICATIONS," the entirety of which application is hereby incorporated by reference herein.

TECHNICAL FIELD

This disclosure relates generally to network communications and, more particularly, to time-spaced messaging for facilitating network communications.

BACKGROUND

Bursts of traffic (e.g., also referred to as bursty traffic or bursty messaging) may occur from time to time in a network and adversely impact the network's provided service. Bursts of traffic may occur when a large number of messages arrives at a sender (e.g., to be processed and sent out) or a receiver (e.g., to be received and processed) and may cause messages to be left unprocessed, message drops, interruption of currently processed messages, etc. In general, bursts of traffic are associated with higher message rates compared to a message rate expected during normal traffic of the network. A message may refer to a frame, a packet, a segment, or generally any protocol data unit (PDU) of an appropriate format for communicating data from the sender to the receiver. On the sender-side, message processing may include generating messages of one or more appropriate formats and transmitting the messages. On the receiver-side, message processing may include analyzing content of received messages and performing actions based on the content.

BRIEF DESCRIPTION OF THE DRAWINGS

Reference will be made to the appended sheets of drawings that will first be described briefly.

Figure 1:
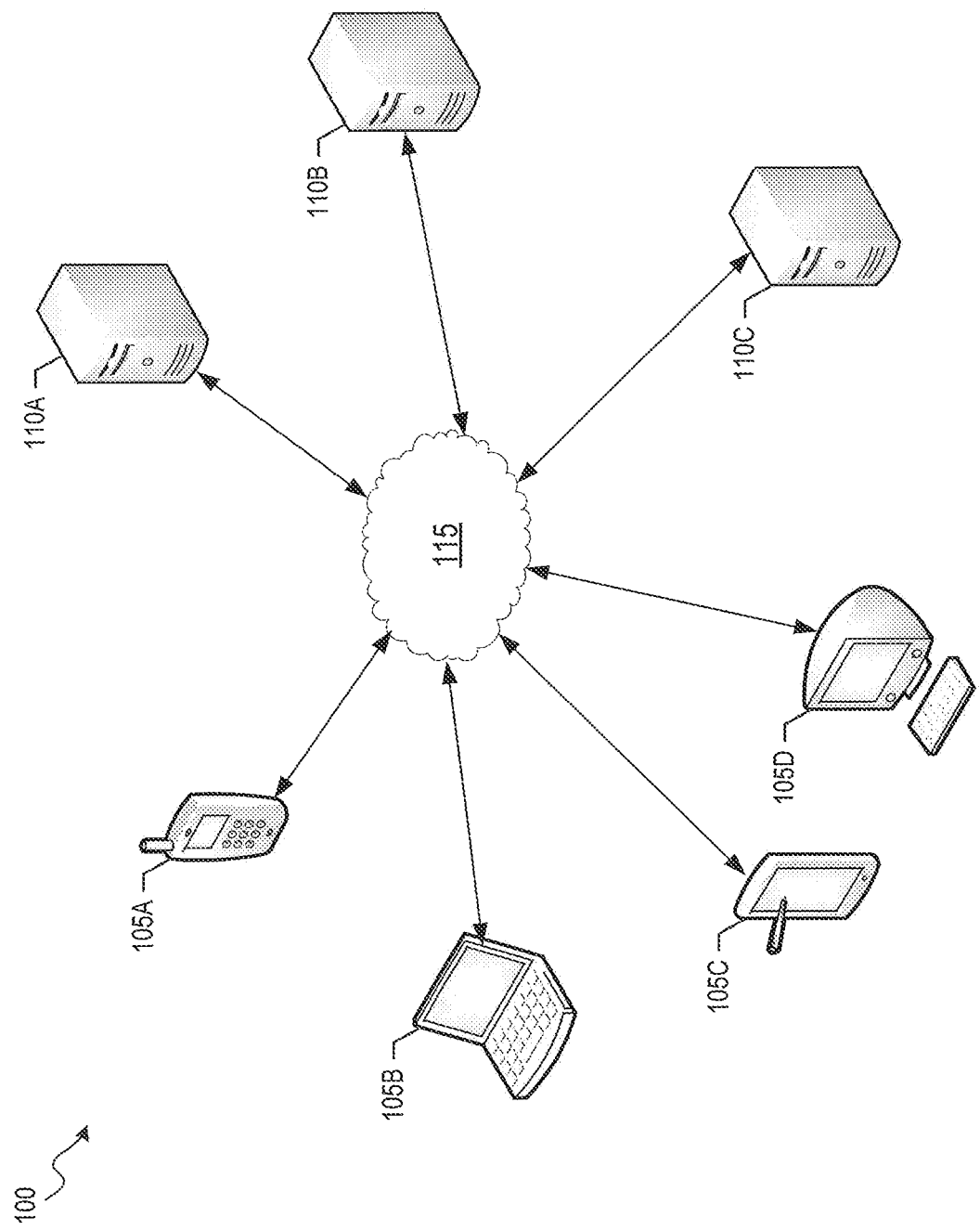
FIG. 1 illustrates an example of a network environment for facilitating time-spaced data communications in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Using various embodiments, time-spaced messaging may be performed at a sender device and/or a receiver device to facilitate network communications. The time-spaced messaging may facilitate handling of traffic bursts. When implemented at the sender device, the sender device may apply a time delay (e.g., also referred to as a time space or a time interval) on messages to be transmitted to the receiver device. The time delay applied determines a time at which each message is transmitted by the sender device to the receiver device. When implemented at the receiver device, the receiver device may apply a time delay to process the messages received by the receiver device. The time delay applied determines a time at which each message received by the sender device is processed by the sender device.

Bursts of traffic are generally associated with an increase (e.g., sudden, unexpected increase) in message rate relative to normal traffic expected of a message sender and/or a message receiver. In some cases, bursts of traffic may be in response to an event, such as a natural disaster, a traffic accident, a network device outage, or generally any event that causes a sudden increase in message rate. In some embodiments, a message may refer to a frame, a packet, a segment, or generally any PDU of an appropriate format for communicating data from a sender device to a receiver device.

In some aspects, bursts of traffic may be associated with user requests for services. User requests for content or service from a server (e.g., a host of a website) may propagate through a network (e.g., a cellular network, other wireless network, and/or a wired network) to the server. The network may allocate resources, such as radio access bearers, to facilitate servicing of the user requests. Time-spaced messaging may be performed to accommodate such user requests even in the case that they arrive as part of bursts of traffic, thus facilitating fulfillment of quality of service (QoS) and/or network performance.

In one or more embodiments, a method includes receiving, by a first network device, a first plurality of messages. The method further includes determining, by the first network device, a first number of the first plurality of messages the first network device is unable to process. The method further includes determining, by the first network device based on the first number, a first miss rate associated with the first plurality of messages. The method further includes determining, by the first network device, whether the first miss rate exceeds a threshold miss rate. The method further includes, if the first miss rate is determined to exceed the threshold miss rate, determining, by the first network device, a first time delay based on the first miss rate and a first message rate associated with the first plurality of messages, where the first message rate is based on a rate at which the first plurality of messages is received by the first network device, and applying, by the first network device, the first time delay to at least one first message received subsequent to the first plurality of messages.

In one or more embodiments, a network device includes one or more processors. The network device further includes a non-transitory machine readable medium including instructions stored therein, which when executed by the one or more processors, cause the one or more processors to perform operations. The operations include receiving a first plurality of messages. The operations further include processing a subset of the first plurality of messages. The operations further include determining a first miss rate associated with the first plurality of messages, where the first miss rate is based on a number of the first plurality of messages that the network device is unable to process. The operations further include determining a first time delay based on the first miss rate. The operations further include applying the first time delay to at least one first message received subsequent to the first plurality of messages. The operations further include processing the at least one first message.

In one or more embodiments, a non-transitory machine readable storage medium includes machine readable instructions which, when executed, cause one or more processors of a first network device to perform operations. The operations include transmitting, by the first network device, a first plurality of messages to a second network device. The operations further include determining a first number of the first plurality of messages that the second network device is unable to process; and determining, based on the first number, a first miss rate associated with the first plurality of messages. The operations further include determining whether the first miss rate exceeds a threshold miss rate. The operations further include, if the first miss rate is determined to exceed the threshold miss rate, determining a first time delay based on the first miss rate and a first message rate associated with the first plurality of messages, where the first message rate is based on a rate at which the first plurality of messages is transmitted by the first network device to the second network device, and transmitting, by the first network device to the second network device, a second plurality of messages according to the first time delay.

The scope of the disclosure is defined by the claims, which are incorporated into this specification by reference. A more complete understanding of embodiments of the disclosure will be afforded to those skilled in the art, as well as a realization of additional advantages thereof, by a consideration of the following detailed description of further embodiments.

Various techniques are provided for facilitating time-spaced messaging for data communications in networks. In some embodiments, time-spaced messaging may be performed to accommodate bursts of traffic, which may occur from time to time in networks. In general, a burst of traffic may involve a high message rate, in which a high number of messages may arrive within a short duration of time (e.g., relative to a normal message rate expected by a network device). Such bursts of traffic may cause messages to remain unprocessed, message drops, multiple attempts to process a message, interruption of currently processed messages, an inability to support a desired QoS, and/or other performance issues. Networks may include non-virtualized networks and virtualized networks. In one embodiment, data communications can occur between a non-virtualized and a virtualized network, between non-virtualized networks, and between virtualized networks. In an aspect, a message may refer to a frame, a packet, a segment, or generally any PDU of an appropriate format for communicating data from a sender device to a receiver device.

Bursts of traffic are generally associated with a sudden increase in message rate relative to normal traffic expected by a message sender and/or a message receiver. In some cases, bursts of traffic may be in response to an event, such as a natural disaster, a traffic accident, a network device outage, or generally any event that causes a sudden increase in message rate. For example, a natural disaster may cause an increase in service requests, such as for text messaging services, voice services (e.g., phone calls, Voice over Internet Protocol (VoIP)), and/or other service requests between relatives and/or with first responders. For instance, the natural disaster may cause a large number of enhanced 911 (E911) call requests between a packet data network (PDN) gateway (PDN-GW or P-GW) and a packet data network. In this example, the packet data network may be a Session Initiation Protocol (SIP)-based network, with the requests being provided by the P-GW to the SIP-based network via an SGi reference point (e.g., also referred to as an SGi interface). As another example, an outage (e.g., unscheduled outage) of a wired local area network (LAN) device may cause devices connected to the wired LAN device to be offloaded to another network, such as a wireless network. The wireless network receives bursts of traffic due to the outage of the wired LAN.

In some cases, data may be communicated in an evolved packet core (EPC) network. The EPC network may include a Policy and Charging Enforcement Function (PCEF) and a Policy and Charging Rules Function (PCRF), among other components. In some cases, the PCEF may be implemented using a server (e.g., non-virtualized), as a virtualized PCEF (vPCEF) defined by a virtual network function (VNF) server (e.g., in a computing cloud), or a combination thereof. In some cases, the PCRF may be implemented using a server (e.g., non-virtualized), as a virtualized PCRF (vPCRF) defined by a VNF server (e.g., in a computing cloud), or a combination thereof.

As an example, in the EPC network, the PCEF may detect multi 5-tuple flows from a web page with multiple icons causing source port changes and report the multiple detections to the PCRF. For instance, the multiple icons may be associated with advertisements from various sources. The web page may be opened in web browsing applications by various wireless devices. When the web page is opened (e.g., at around the same time) by many wireless devices served by the EPC network, the PCEF may report the multiple detections for each wireless device to the PCRF in a very short time (e.g., almost simultaneously) that the PCRF may not be able to respond due to limitations in its processing logic capability (e.g., limitations in hardware and/or software capacity).

In some embodiments, time-spaced messaging may be performed at a sender device and/or at a receiver device to accommodate one or more bursts of traffic. With reference to the above example, the time-spaced messaging may be utilized to accommodate the reporting of the detection of the multiple 5-tuple flows by the PCEF to the PCRF and/or accommodate the processing of such reporting by the PCRF. More generally, at the sender device, the sender device may generate a first plurality of messages of an appropriate format (e.g., packet format) and transmit the messages to the receiver device at a certain message rate (e.g., a number of messages transmitted per unit of time). The sender device may determine a number of these messages that the receiver device is unable to process. Based on the number, the sender device may determine a miss rate associated with the first plurality of messages. The miss rate is a number of misses per unit of time. In some cases, each miss is associated with one message that the receiver device is unable to process.

The sender device may determine whether the miss rate exceeds a threshold miss rate (e.g., by comparing the miss rate with the threshold miss rate). If the miss rate exceeds the threshold miss rate, the sender device may determine a time delay based on the miss rate associated with the first plurality of messages and the message rate associated with the first plurality of messages. In an aspect, the sender device may be considered to have sent a burst of traffic to the receiver device when the miss rate exceeds the threshold miss rate. In some cases, the threshold miss rate may be a zero miss rate, such that any non-zero miss rate causes the sender device to determine and apply a time delay to messages to be transmitted in order to facilitate processing of these messages by the receiver device.

In an aspect, to implement time spacing of messages, the sender device may apply the time delay by spacing out transmission of a second plurality of messages to the receiver device. For example, for a time delay of $T_d=5$ ms, the sender device may transmit one message every 5 ms. The sender device may include a queue to store the messages to be transmitted, where the messages may be retrieved for transmission according to the applied time delay. In some cases, the sender device may monitor the message rate and miss rate (e.g., periodically, in real-time, etc.) and adjust the time delay accordingly to reduce the miss rate. In general, once the time delay is reduced down to zero (e.g., associated with a normal traffic mode), the burst of traffic can be considered to have been mitigated.

In an aspect, the sender device may determine the number of messages the receiver device is unable to process based on feedback from the receiver device. For example, the receiver device may transmit, to the sender device, a feedback message that indicates whether the receiver device is able to process a certain message. In the case that the receiver device is unable to process the certain message, the receiver device may transmit, to the sender device, a feedback message that includes a process error code or otherwise any data indicative of the receiver device being unable to process the certain message received by the receiver device from the sender device. In this example, upon receiving this feedback message from the receiver device, the sender device determines that the receiver device is unable to process the certain message transmitted by the sender device to the receiver device. As another example, a lack of feedback from the receiver device with regard to a certain message transmitted by the sender device may be indicative of the receiver device being unable to process the certain message. The lack of a response may be a lack of an acknowledgement (ACK) message, a lack of a message including an indication (e.g., process error code) that the receiver device is unable to process the certain message, and/or a lack of an indication that the certain message from the sender device has been handled (e.g., user device does not receive requested service). As such, for a given message, a lack of feedback may also be considered feedback provided by the receiver device to the sender device that indicates the receiver device is unable to process the message.

In some cases, each message transmitted by the sender device may be associated with a message sequence number. Feedback to the sender device from the receiver device may also be associated with the same message sequence number, such that the sender device may determine which messages are successfully processed by the receiver device and which messages are misses (e.g., unable to be processed by the receiver device). Based at least on message sequence numbers, the sender device may determine whether a message transmitted by the sender device received an error code or received no feedback message. Each message transmitted by the sender device to which the sender device receives, from the receiver device, an error code or no feedback message can be considered a miss. For example, if the sender device sends 5 messages/ms and receives only two messages indicating successful processing by the receiving device, the miss rate is 3 messages/ms (i.e., 5 messages/ms minus 2 messages/ms).

At the receiver device, the receiver device may receive messages of an appropriate format (e.g., packet format) from the sender device and process the messages. The receiver device may receive the messages at a certain message rate (e.g., a number of messages received per unit of time). The receiver device may determine a number of these messages that the receiver device is unable to process according to one criterion or more than one criterion. Based on the number, the receiver device may determine a miss rate associated with the messages received from the sender device. In some cases, each miss is associated with one message received from the sender device that the receiver device is unable to process.

As one example, the receiver device may determine that it is unable to process a message if the receiver device is unable to process the message within a threshold time duration after having received the message. The threshold time duration may be set (e.g., by an administrator of the receiver device and/or an associated communication standard) to satisfy a desired QoS and may be application dependent. In an embodiment, if the receiver device is unable to initiate processing of a given message before the threshold time duration has elapsed, the receiver device may drop the message (e.g., with or without sending feedback to the sender device), and the message may be considered a miss. For example, for a given message, the receiver device may associate a timestamp with the message once received from the sender device (e.g., timestamp may be data indicative of a time the message is received by the receiver device) and utilize the timestamp to determine whether the receiver device is able to process the message within the threshold time duration. In alternative aspects, the threshold time duration may be defined starting from a time at which the sender device transmitted the message, rather than starting from a time at which the receiver device received the message. For example, the sender device may include a timestamp in the transmitted message indicative of a time at which the sender device transmitted the message. In this example, for each transmitted message, the sender device may have a respective response timer that tracks an amount of time that has elapsed since the message was transmitted by the sender device.

In some cases, the receiver device may determine that it is unable to process at least some incoming messages based on an incoming message rate and/or a status (e.g., queue length) of a buffer(s) of the receiver device. For example, the receiver device may determine that it is unable to process at least some incoming messages if the receiver device detects that messages are being received by the receiver device at a faster rate than a normal receiving message rate of the receiver device and/or a faster rate than the receiver device can process (e.g., based on the receiver device's processing capability). For instance, messages that arrive at the receiver device for processing may be queued in one or more buffers (e.g., memory or memories of the receiver device and/or otherwise memory or memories accessible to the receiver device). If the rate at which messages are placed in the buffer(s) to await processing is higher than a normal rate for the receiver device and/or higher than a rate that the receiver device can process messages, the receiver device may determine it is unable to process at least some of the received messages. In some cases, for any messages received by the receiver device when its buffer is full (or each of its multiple buffers is full), the receiver device may determine that it is unable to process these messages. In this example, if a buffer has a configurable size, the buffer may be considered to be full when messages fill the buffer to its maximum allowable/allocatable size (e.g., set by an administrator of the receiver device and/or memory capacity).

The receiver device may determine whether the miss rate exceeds a threshold miss rate (e.g., by comparing the miss rate with the threshold miss rate). If the miss rate exceeds the threshold miss rate, the receiver device may determine a time delay based on the miss rate and message rate associated with the received messages. In an aspect, the receiver device may be considered to have received a burst of traffic from the sender device when the miss rate exceeds the threshold miss rate. In some cases, the threshold miss rate may be a zero miss rate, such that any non-zero miss rate causes the receiver device to determine and apply a time delay to messages received from the sender device in order to facilitate processing of these messages by the receiver device.

In an aspect, to implement time spacing of messages, the receiver device may apply the time delay by spacing out processing of the received messages. For example, for a time delay of $T_d = 3.5$ ms, the receiver device may process one message every 3.5 ms. The receiver device may include a queue to buffer the messages to be processed, where the messages may be retrieved from the message buffer for processing according to the applied time delay. In some cases, the receiver device may monitor the message rate and miss rate (e.g., periodically, in real-time, etc.) and adjust the time delay accordingly to reduce the miss rate. In general, once the time delay is reduced down to zero (e.g., associated with a normal traffic mode), the burst of traffic can be considered to have been mitigated.

In some aspects, timers may be used to facilitate message transmission and associated message response. For example, in some cases, for each message transmitted by a sender device, the sender device may utilize a response timer to track the amount of time that has elapsed since the message was transmitted by the sender device. If the sender device receives no feedback from the receiver device regarding a certain message within a threshold amount of time, the response timer for that message times out and the sender device may initiate retransmission of the message. In this regard, for a given message transmitted by a sender device to a receiver device, the response timer of the sender device associated with the message may time out due to, for example, a transmission link being down or the receiver device not being able to process the message. The sender device may detect message transmission losses (e.g., misses) based on missing responded message sequence numbers and/or response timer times out. In some cases, time-spaced messaging may be applied by the sender device to mitigate retransmissions due to timing out of the sender device's response timers.

The threshold amount of time before the response timer times out may be statically configured or dynamically configured. In an aspect, the threshold amount of time may be set as part of a handshake procedure between the receiver device and the sender device. In some cases, the threshold amount of time before timeout of the response timer is generally set to be much larger than an expected amount of time between transmission of a message to the receiver device by the sender device and receipt of an associated feedback message from the receiver device by the sender device.

In some aspects, a bursty traffic condition refers to the case that the miss rate exceeds the threshold miss rate. When the bursty traffic condition is satisfied, the sender device and/or receiver device may apply a non-zero time delay and may be referred to as operating in a bursty traffic mode. When the bursty traffic condition is not satisfied, the sender device and receiver device may apply no time delay to messages to be transmitted and received messages, respectively, and may be referred to as operating in a non-bursty traffic mode (e.g., generally a normal traffic mode). In some cases, a message rate may be referred to as a burst rate during bursty traffic mode (e.g., in cases where messages sent at the message rate cause a miss rate to exceed a threshold miss rate).

On the sender-side, when the bursty traffic condition is satisfied, the message rate may be high with a large number of messages transmitted by the sender device within a short time duration (e.g., messages may be transmitted substantially simultaneously). In an embodiment, the sender device may determine the time delay on a per-receiver basis. For example, within a given time duration, the sender device may transmit a first plurality of messages to a first receiver device and a second plurality of messages to a second receiver device. The first receiver device may be able to process all of the first plurality of messages received from the sender device, whereas the second receiver device is unable to process all of the second plurality of messages received from the sender device. In this example, the sender device does not apply any delay to messages transmitted to the first receiver, but does apply a time delay to messages transmitted to the second receiver device. More generally, time delay may be determined on a per-port basis, such as in cases when a device has multiple receive ports for receiving messages and/or multiple transmit ports for transmitting messages. For a receiver device that serves multiple sender devices, implementing time-spacing at the sender devices may facilitate handling of bursty messaging and can reduce the buffer size and queuing length for the receiver device.

In some embodiments, time-spacing of messages may mitigate chain performance impact to network processing subsequent to network processing by the receiver device. For example, in a case that the receiver device processes messages in a first-in first-out (FIFO) manner without utilizing time-spacing, the receiver device generally processes one message immediately after having finished processing a previous message. In one case, the receiver device may not be able to process messages and respond to the sender device(s) in a specified amount of time (e.g., a response time interval) when the bursty message queue is long. When a sender device's response timer times out, the sender device may detect such time out as a message loss and then initiate retransmission. Such an occurrence may be cyclic between the sender device(s) and the receiver device and cause degradation in the network performance.

Even in a case that the receiver device may process buffered bursts of messages (e.g., within a response time interval), processing devices subsequent to the receiver device may be unable to process bursts of messages resulting from the bursts of messages processed by the receiver device. In this regard, subsequent service processing by subsequent service devices may be jammed and unable to process at least some of their respective received messages. As such, such chain performance impact of messages processed by the receiver device may lead to instability.

Time spacing may be defined with a certain optimization objective to provide stability, such as by mitigating chain performance impact. In this regard, one or more sender-receiver pairs along the chain may implement the time spacing. Example optimization objectives for time spacing may include applying (e.g., by the receiver device to messages received by the receiver device) a time delay that causes the miss rate to reduce below a threshold miss rate (e.g., zero miss rate) and/or applying a time delay that mitigates chain performance impact to network processing that occurs subsequent to processing of bursts of messages by the receiving device. In this regard, the receiver device may determine and apply a time delay that takes into consideration network processing that occurs subsequent to processing by the receiver device.

As an example, a chain of sender-receiver pairs may include a first device, a second device, and a third device. The first device may transmit messages to the second device. The second device may process the messages received from the first device and then transmit messages to the third device. Time spacing may be implemented by the first device (as a sender device) to space out messages to be transmitted by the first device to the second device; by the second device (as a receiver device) to space out processing of messages received from the first device; by the second device (as a sender device) to space out messages to be transmitted by the second device to the third device; and/or by the third device (as a receiver device) to space out processing of messages received from the second device. As another example, a chain of sender-receiver pairs may include two devices. The first device may transmit a first set of messages to the second device, and the second device may process the first set of messages and transmit a second set of messages to the first device. Time spacing may be implemented by the first device (as a sender device) to space out messages to be transmitted by the first device to the second device; by the second device (as a receiver device) to space out processing of messages received from the first device; by the second device (as a sender device) to space out messages to be transmitted by the second device to the first device; and/or by the first device (as a receiver device) to space out processing of messages received from the second device.

In some aspects, when time-spaced messaging is implemented by the sender device, the receiver device may be, but need not be, aware that the sender device is implementing time-spaced messaging. Similarly, when time-spaced messaging is implemented by the receiver device, the sender device may be, but need not be, aware that the receiver device is implementing time-spaced messaging. In this regard, in some aspects, time spacing for bursty message transmission (e.g., by a sender device) or processing (e.g., by a receiver device) is independent from a response timer (e.g., generally set at by the sender device).

Thus, using various embodiments, since the bursts of traffic are not a normal operational behavior of a network, time-spaced messaging may facilitate handling of the bursts of traffic during instances of such bursty traffic. For a given sender-receiver pair, time-spaced messaging may be performed by a sender device, a receiver device, or both the sender device and the receiver device. Such handling of the bursts of traffic may be performed while minimizing or avoiding message retransmissions (e.g., which generally reduce throughput and/or system performance) and/or without hardware improvement (e.g., to improve transactions per second (TPS)) and/or software processing logic improvement (e.g., consolidate multiple messages into a single message for transmission). In this regard, since bursty messaging is not a normal operational behavior of a network, implementing hardware capacity improvement and/or software processing logic improvement to handle instances of bursty traffic can be costly and unnecessary.

FIG. 1 illustrates an example of a network environment 100 for facilitating time-spaced data communications in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The network environment 100 includes user devices 105A-D, servers 110A-C, and a network 115. The user devices 105A-D and the servers 110A-C may be in communication directly or indirectly. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events.

In FIG. 1, as depicted by the double-ended arrows, the user devices 105A-D, the servers 110A-C, and components (e.g., access points) of the network 115 may communicate using one or more wireless communication technologies and/or one or more wired communication technologies. The network environment 100 may be a distributed client/server system that spans one or more networks, including, for example, the network 115. Such networking environments are commonplace in offices, enterprise-wide computer networks, intranets, and the Internet. The network 115 may include, for example, a LAN, a wide area network (WAN), a cellular network, an Intranet, a network of networks (e.g., the Internet), or a combination thereof to connect any number of user devices and servers.

The user devices 105A-D, the servers 110A-C, and the components of the network 115 may include one or more radio transceivers (e.g., antennas) along with associated logic, circuitry, interfaces, memory, and/or code that enable communications via wireless interfaces and using the radio transceivers. In an embodiment, the user devices 105A-D, the servers 110A-C, and/or the components of the network 115 may wirelessly communicate with each other using wireless standards, such as the Institute of Electrical and Electronics Engineers (IEEE) 802.11 standard (e.g., IEEE 802.11ac, 802.11ad, etc.), Bluetooth® standard, ZigBee® standard, and/or other wireless standards; cellular standards, such as 3G, 4G, 4G LTE, 5G, other $3^{rd}$ Generation Partnership Project (3GPP)-based cellular standard, and/or other cellular standards; infrared-based communication; optical-based communications; and/or other appropriate communication standards and/or protocols.

In some aspects, the user devices 105A-D, the servers 110A-C, and the components of the network 115 may include suitable logic, circuitry, interfaces, memory, and/or code that enable wired communications. In this regard, the user devices 105A-D, the servers 110A-C, and/or the components of the network 115 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. A wired link may be implemented with a power-line cable, coaxial cable, fiber-optic cable, or other cable or wires that support corresponding wired network technologies.

The connections (e.g., wired, wireless) shown in FIG. 1 are provided by way of non-limiting example. In this regard, although double-ended arrows are depicted as connecting the network 115 to each of the user devices 105A-D and the servers 110A-C to facilitate communication via the network 115, a user device may communicate with another user device, a user device may communicate with a server, and/or a server may communicate with another server directly and/or indirectly without utilizing the network 115. In addition, the user devices 105A-D and the servers 110A-C may be connected to one or more other networks not shown in FIG. 1.

In an embodiment, the network environment 100 is implemented to form part of a cellular network, such as a 3G, 4G, 5G, and/or other 3GPP-based cellular network, and/or a cellular network based on other cellular standards. In this embodiment, the network 115 may include a radio access network (RAN) (e.g., also referred to as an access network), a core network, and an external network. The RAN may include access points (e.g., base stations) that connect the user devices 105A-D to the core network, which in turn may connect the user devices 105A-D to the external network, such as a PDN. In this manner, the network 115 may allow data communication between the user devices 105A-C and the servers 110A-C. In an aspect, the PDN may include an Internet Protocol (IP) multimedia subsystem (IMS), a packet switch streaming (PSS) system (e.g., IMS-based PSS system), and/or other systems, networks, frameworks, etc. for providing data communication services (e.g., IP multimedia services). For example, the PDN may facilitate services (e.g., IP services) such as VoIP. The PDN may utilize appropriate communication protocols such as SIP. It is noted that the network 115, or components thereof, may be virtualized or non-virtualized.

Each of the user devices 105A-D may be, may include, may be a component of, and/or may be referred to as user equipment (UE). One or more of the user devices 105A-D may be, and/or may include a mobile phone (e.g., smartphone), a smartwatch, a personal digital assistant (PDA), a tablet device, a game console, a navigation device, a computer, or generally any device that is operable to communicate wired and/or wirelessly (e.g., via appropriate communication standards using antennas). A user of any of the user devices 105A-D may transmit requests for content (e.g., web content) and/or a service (e.g., VoIP service) from one or more content providers and/or service providers.

The servers 110A-C may each be any system having one or more processors, one or more memories, and communications capability for facilitating handling of user requests. In some example aspects, one or more of the servers 110A-C can be a single computing device. In other implementations, one or more of the servers 110A-C may represent multiple computing devices working together to perform actions (e.g., as part of a server farm) pertaining to the user requests. Further, the servers 110A-C may represent various forms of servers including a web server, an application server, a proxy server, a network server, or a server farm.

As one example, the server 110A may host a website. The server 110A may operate to handle requests for web content of the website received from UEs, such as requests from one or more of the user devices 105A-D. The requests may be included in messages received by the server 110A from the user devices 105A-D (e.g., via the network 115). For instance, the user devices 105A and 105C may request web content from the server 110A. The server 110A may retrieve the requested web content (e.g., from memory associated with the server 110A or other computing device not shown in FIG. 1) and provide the respective requested web content to the user devices 105A and 105C. In some cases, requests from UEs for web content of the website may be collectively handled by the servers 110A and 110B.

As another example, the network 115 may include components (e.g., network devices not shown in FIG. 1) that service the user devices 105A-D by facilitating network connectivity of the user devices 105A-D. For example, the network 115 may provide a network policy enforcement service to control access to services (e.g., voice services, texting services) supported by one or more networks (e.g., the network 115 and/or other network connected to the network 115) and maintain a QoS for users that can access such a network(s) (e.g., subscribed users). The user devices 105A-D may transmit messages that contain requests for services. One or more components of the network 115 may process the requests from the user devices 105A-D.

In some embodiments, time-spaced data communications can be implemented by a sender device and/or a receiver device (e.g., to handle bursts of traffic). In one example, the server 110A may apply a time delay to messages received by the server 110A from UEs (e.g., the user devices 105A-D) via the network 115 in order to facilitate processing of the messages by the server 110A. In another example, components within the network 115 may apply a time delay on a per-component basis at a sender-side and/or a receiver-side to facilitate handling of requests received from UEs. An example of a network for handling UE requests is described with respect to FIG. 2.

Figure 2:
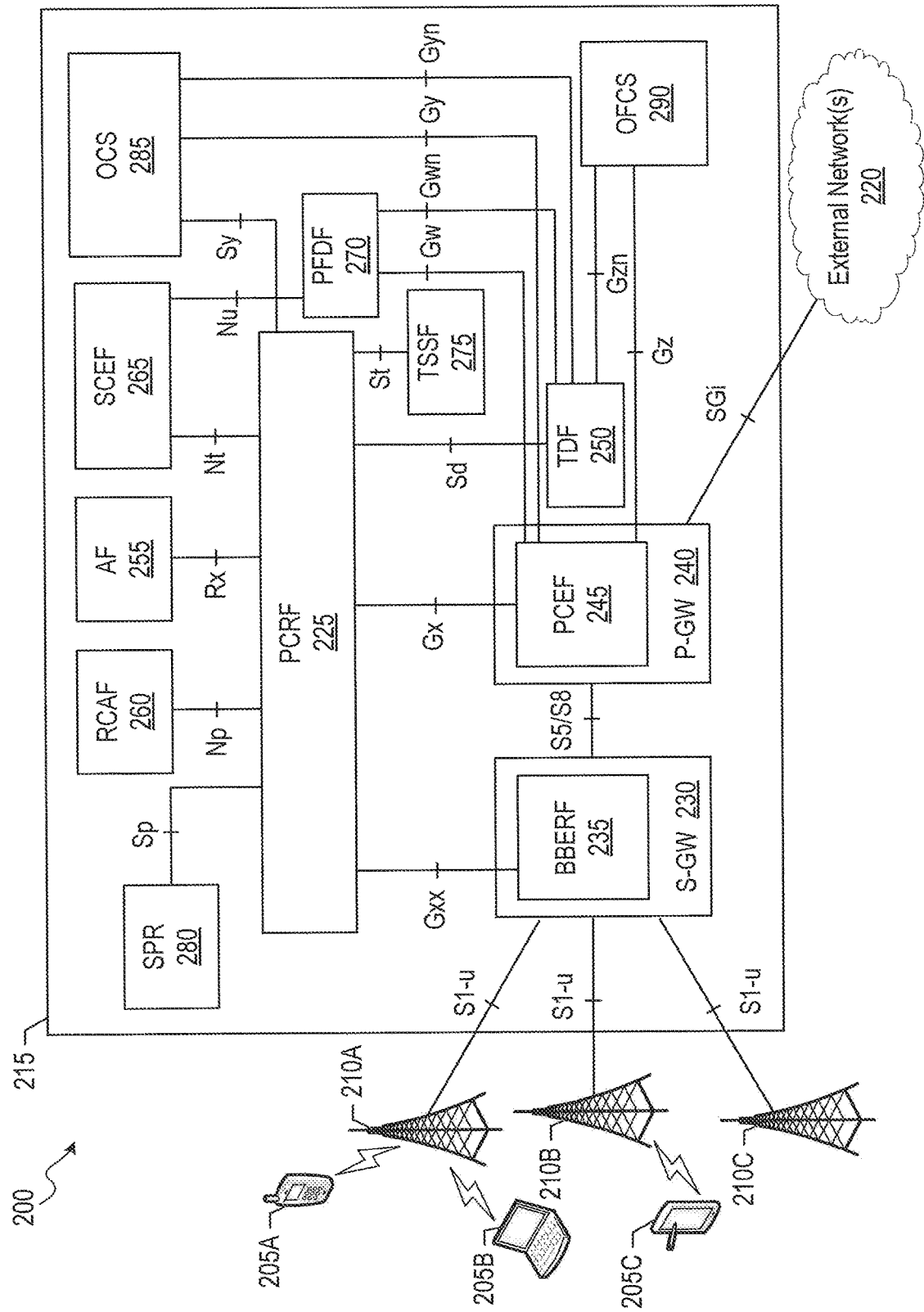
FIG. 2 illustrates an example of a cellular network environment for facilitating time-spaced data communications in accordance with one or more embodiments of the present disclosure.

FIG. 2 illustrates an example of a cellular network environment 200 for facilitating time-spaced data communications in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The cellular network environment 200 includes user devices 205A-C, base stations 210A-C, a Policy and Charging Control (PCC) architecture 215, and one or more external networks 220. In some aspects, for explanatory purposes, the PCC architecture 215 is implemented based on 3GPP standards, with functionalities of components of the PCC architecture 215 set forth in the 3GPP specifications. Examples of such functionalities are provided below. The base stations 210A-C may be part of a RAN that connects the user devices 205A-C to a core network (e.g., an EPC network). The PCC architecture 215 may be a part of the core network. The external network(s) 220 may include a PDN for providing data communication services (e.g., IP multimedia services).

The core network may utilize bearers (e.g., evolved packet system (EPS) bearers) to route data (e.g., packets, IP traffic) between a gateway of the core network and the user devices 205A-C. A bearer may refer generally to a data flow (e.g., IP packet flow) with a defined QoS between a gateway and a user device. The access network and core network together may set up and release bearers as needed by various applications. In some cases, bearers may be a minimum guaranteed bit rate bearer (e.g., for VoIP) or a non-guaranteed bit rate bearer (e.g., for web browsing). In an embodiment, the network 115 of FIG. 1 may include the RAN, the core network, and the external network(s) 220 for facilitating data communication between the user devices 105A-D (e.g., connected to the access network) and the servers 110A-C (e.g., connected to the external network 220).

One or more of the user devices 205A-C may be, and/or may include a mobile phone (e.g., smartphone), a smartwatch, a PDA, a tablet device, a game console, a navigation device, a computer, or generally any device that is operable to communicate wirelessly (e.g., via cellular standards using antennas) with the base stations 210A-C (or other base station of the RAN). The user devices 205A-C may run one or more applications that engage in data transfer (e.g., in packets) between the user devices 205A-C and the external network(s) 220 via the RAN and core network. Such data transfers may include downlink data transfers from the external network(s) 220 to the user devices 205A-C and/or uplink data transfers from the user device 205A-C to the external network(s) 220. By way of non-limiting example, applications may include web browsing, messaging (e.g., short messaging service (SMS)), VoIP, and media streaming. Generally, each application may be associated with different QoS preferences or requirements for the data transfers. In some cases, transfer of different types of data (e.g., web content, VoIP data, streaming data) can be served by different bearers within the core network according to parameters (e.g., QoS parameters, billing parameters).

In some embodiments, one or more of the user devices 205A-C may be in one of three different states at a given moment in time: a detached state, an idle state, and an active state. The detached state may be a transitory state in which a user device is powered on and engaged in a process of searching and registering with the access network. In the active state, the user device may be registered with the access network and may have established a wireless connection (e.g., radio resource control (RRC) connection) with the access network (e.g., one of the base stations 205A-C).

In the idle state, the user device is generally in a power conservation state in which the user device is connected to the access network but typically does not communicate data to the access network. In some cases, in the idle state, the user device may receive paging messages (e.g., from the core network via the access network), which may, but need not, bring the user device out of the idle state.

One or more of the base stations 210A-C of the access network may include, may be a component of, and/or may be referred to as, a cell, a Node B (NB), an Evolved Node B (eNodeB or eNB), or a Home eNB (HeNB). For example, as shown in FIG. 2, the user devices 205A-B are connected to the core network via the base station 210A, and the user device 205C is connected to the core network via the base station 210B. The base stations 210A-C may be macrocell base stations, microcell base stations, picocell base stations, femtocell base stations, and/or other cell sizes. For example, the macrocell base station may provide a coverage area over a radial range up to the tens or hundreds of kilometers, the picocell base station may provide coverage over a radial range in the hundreds of meters, and the femtocell base station may provide coverage over a radial range in the tens of meters.

The PCC architecture 215 includes a PCRF 225, a serving gateway (S-GW) 230, a P-GW 240, a Traffic Detection Function (TDF) 250, an Application Function (AF) 255, a RAN Congestion Awareness Function (RCAF) 260, a Service Capability Exposure Function (SCEF) 265, a Packet Flow Description Function (PFDF) 270, a Traffic Steering Support Function (TSSF) 275, a Subscription Profile Repository (SPR) 280, an Online Charging System (OCS) 285, and an Offline Charging System (OFCS) 290. It is noted that the various components of the PCC architecture 215 shown in FIG. 2 may be implemented using one or more devices and/or utilizing centralized and/or distributed hardware and software. For example, the PCRF 225 may be implemented using and referred to as a PCRF device, PCEF 245 may be implemented using and referred to as a PCEF device, and so forth. Although the various components (e.g., 225, 230, 235, 240, etc.) of the PCC architecture 215 are depicted in FIG. 2 as separate devices connected to other devices and with their own enclosures (e.g., represented as rectangles), in some cases the various components may be integrated on the same integrated circuit and/or enclosed in a common housing.

The user devices 205A-C, components of the access network (e.g., including base stations 210A-C), components of the core network (e.g., including the PCC architecture 215), and components of the external network(s) 220 may include suitable logic, circuitry, interfaces, memory, and/or code that enable communications. In some aspects, each of the user devices 205A-C, the components of the access network, the components of the core network, and the components of the external network(s) 220 may be implemented and referred to as network devices, networked devices, network components, or networked components. Components of the access network (e.g., the base stations 210A-C), the core network (e.g., the PCC architecture 215), and the external network(s) 220 may communicate via reference points between the components. For example, the base stations 210A-C may communicate with the S-GW 230 of the PCC architecture 215 using an S1-u reference point residing between the base stations 210A-C and the S-GW 230. The P-GW 240 may communicate with the external network(s) 220 using an SGi reference point between the P-GW 240 and the external network(s) 220. In an aspect, a reference point may be referred to as an interface. For example, the S1-u reference point may also be referred to as an S1-u interface.

In some aspects, in addition to the PCC architecture 215, the core network may include an authentication, authorization, and accounting (AAA) server, a home subscriber server (HSS), a mobility management entity (MME), and/or other components not shown in FIG. 2. For example, the base stations 210A-C may be connected to the MME via an S1-MME interface (not shown) and to the S-GW via the S1-u interface.

In some embodiments, data traffic between any two components may be monitored and analyzed to detect bursts of traffic and associated message rates (e.g., burst rates) and miss rates, and determine time delays to mitigate such bursts of traffic (e.g., time delays to cause miss rates to drop to zero). By way of non-limiting example, the monitored/analyzed data traffic may be traffic received by the base station 210A from one or more UEs, traffic between the base station 210A and the S-GW 230 via the S1-u reference point, traffic between the PCRF 225 and PCEF 245 via a Gx reference point, traffic between the SCEF 265 and the PFDF 270 via an Nu reference point, traffic between the P-GW 240 and the external network(s) 220 via the SGi interface(s), and so forth. In some cases, more generally, each component may have one or more transmit ports (e.g., for transmitting messages to other components) and/or one or more receive ports (e.g., for receiving messages from other components). Data traffic may be monitored/analyzed on a per-port basis. For explanatory purposes, for the PCC architecture 215, data traffic can be measured by numbers of messages sent over the various reference points. In some aspects, a message may refer to a frame, a packet, a segment, or generally any PDU of an appropriate format for communicating data from a sender device to a receiver device.

For a given component, different reference points and/or different ports may be associated with different amounts of data traffic and thus different message rate (e.g., transmit and/or receive message rate), miss rate, and applied time delay. For example, in some cases, the PCRF 225 may apply a time delay to messages received from the PCEF 245 via the Gx reference point (e.g., in response to detecting bursty messaging from the PCEF 245) while not applying any time delay to messages received from the AF 255 via an Rx reference point (e.g., no bursty messaging from the AF 255 is detected).

The PCC architecture 215 may be utilized to apply policy to user requests (e.g., received from the user devices 205A-C) to access to one or more services offered via one or more networks. The policies may be utilized to facilitate management of end-to-end services and network resources associated with such services. The PCC architecture 215 may store, update, and/or otherwise manage policies associated with different users. In some cases, for a given user, different policies may be applied to different types of requests from the user.

The PCRF 225 of the PCC architecture 215 encompasses policy control decision-making and flow-based charging control functionalities. The PCRF 225 may support network control pertaining to policy validation, service data flow detection, gating, QoS management, and flow-based charging towards the PCEF 245. For example, the PCRF 225 may generate decisions regarding how certain service data flow/detected application traffic are to be handled in the PCEF 245 and the TDF 250, if applicable, and ensure that PCEF user plane traffic mapping and treatment is in accordance with a user's subscription profile. The PCRF 225 receives messages from and transmits messages to various components of the PCC architecture 215 to facilitate network control as described further herein.

The S-GW 230 may receive, route, and forward user data received from the user devices 205A-C and act as a mobility anchor for user plane operation during handovers between base stations (e.g., the base stations 210A-C) of the access network. Additionally, the S-GW 230 may manage and store context of the user devices 205A-C, such as one or more parameters of an IP bearer service and a network internal routing information. In some cases, the S-GW 230 may collect information associated with network use by the user devices 205A-C, such as volume of data sent to and/or received by the user devices 205A-C (e.g., for billing purposes).

In some aspects, the S-GW 230 may terminate a downlink data path (e.g., from an external network to a user device) when a user device is in an idle state and trigger a paging operation to the user device when downlink data arrives for the user device. For example, the S-GW 230 may send a message to the MME (not shown in FIG. 2) of the core network that instructs the MME to transmit a paging message to the user device via the base station to which the user device is connected. If the user device responds to the paging message, the S-GW 230 can forward the downlink data to the user device via the base station to which the user device is connected.

A Bearer Binding and Event Reporting Function (BBERF) 235 may be implemented as part of the S-GW 230. The BBERF 235 may perform bearer binding, uplink bearer binding verification, event reporting to the PCRF 225, and/or sending or receiving parameters associated with an IP connectivity access network (IP-CAN) to or from the PCRF 225. A Gxx reference point residing between the PCRF 225 and the BBERF 235 may enable the PCRF 225 to have dynamic control over the BBERF 235. The Gxx reference point may enable signaling of QoS control decisions. For example, the Gxx reference point may support establishment and termination of a Gxx session, request for QoS decisions from the BBERF 235 to the PCRF 225, provision of QoS decisions from the PCRF 225 to the BBERF 235, and delivery of IP-CAN-specific parameters from the PCRF 225 to BBERF 235 or from the BBERF 235 to the PCRF 225.

The P-SW 240 can provide connectivity between the user devices 205A-C and the external network(s) 220. The P-GW 240 may perform IP address allocation for the user devices 205A-C, QoS enforcement, and flow-based charging (e.g., according to rules from the PCRF 225). The P-GW 240 may filter downlink user IP packets into different QoS-based bearers. In some cases, the P-GW 240 may serve as a mobility anchor for interworking with non-3GPP technologies (e.g., IP-based technologies).

A PCEF 245 may be implemented as part of the P-GW 240. The PCEF 245 encompasses service data flow detection, policy enforcement, and flow-based charging functionalities. The PCEF 245 may provide service data flow detection, user plane traffic handling, QoS handling, service data flow measurement, and online and offline charging interactions. In some aspects, the PCEF 245 may perform such operations in response to messages (e.g., policy control decisions) from the PCRF 225. For example, the PCRF 225 may control flow-based charging functionalities in the PCEF 245. In response to messages from the PCRF 225, the PCEF 245 may associate each of the user devices 205A-C with a QoS class identifier and bit rates that determine how a respective data flow for the user devices 205A-C is serviced and verify that such association is in accordance with the users' subscription profiles.

The PCEF 245 and PCRF 225 may communicate with each other using a Gx reference point that resides between the PCEF 245 and the PCRF 225. The Gx interface may enable the PCRF 225 to have dynamic control over the PCC and application detection and control (ADC) behavior at the PCEF 245 and enable signaling of PCC/ADC decisions. By way of non-limiting example, the Gx reference point may support establishing of a Gx session by the PCEF 245, requesting for PCC/ADC decisions from the PCEF 245 to the PCRF 225, provisioning of PCC/ADC decisions from the PCRF 225 to the PCEF 245, reporting of a start and a stop of detected applications and transfer of service data flow descriptions and application instance identifiers for detected applications from the PCEF 245 to the PCRF 225, and reporting of accumulated usage of network resources on a per IP-CAN session basis from the PCEF 245 to the PCRF 225.

The TDF 250 may perform application detection and reporting of detected application and its service data flow description to the PCRF 225. The TDF 250 may detect a start and a stop of application traffic for ADC rules that the PCRF 225 has activated at the TDF 250 (e.g., solicited application reporting) or ADC rules pre-provisioned at the TDF 250 (e.g., unsolicited application reporting). The detections may be reported by the TDF 250 to the PCRF 225. The TDF 250 and PCRF 225 may communicate with each other using an Sd reference point that resides between the TDF 250 and the PCRF 225. The Sd reference point may enable the PCRF 225 to have dynamic control over application detection and control behavior at the TDF 250 and enable signaling of ADC decisions. By way of non-limiting example, the Sd interface may support establishment and termination of a TDF session between the PCRF 225 and the TDF 250, provisioning of ADC decisions from the PCRF 225 for applications' traffic detection and enforcement at the TDF 250, and requesting for ADC decisions from the TDF 250 to the PCRF 225. In some cases, such as for solicited application reporting, the PCRF 225 may request the TDF 250 to perform enforcement actions and usage monitoring. Alternatively, or in addition to being performed at the TDF 250, actions resulting from application detection may be performed by the PCEF 245 as part of the charging and policy enforcement.

The AF 255 may offer applications that require dynamic policy and/or charging control over IP-CAN user plane behavior. The AF 255 may communicate with the PCRF 225 to transfer dynamic application session-related information, such as subscriber identifier, IP address of the user device, and media type and format, that may be utilized by the PCRF 225 to make policy decisions. In some aspects, the PCRF 225 may provide such policy decisions to the PCEF 245. In some cases, the AF 255 may receive an indication that service information associated with a user device is not accepted by the PCRF 225 together with service information that the PCRF 225 would accept. In such cases, the AF 255 rejects service establishment towards the user device. If possible, the AF 255 may forward service information to the user device that the PCRF 225 would accept. The AF 255 and PCRF 225 may communicate with each other using an Rx reference point that resides between the AF 255 and the PCRF 225. The Rx reference point may enable transport of application level session information from the AF 255 to the PCRF 225. For example, such information may include IP filter information to identify service data flow for policy control and/or differentiated charging, and media/application bandwidth requirements for QoS control.

The RAN Congestion Awareness Function (RCAF) 260 may communicate with the PCRF 225 via an Np reference point residing between the RCAF 260 and the PCRF 225. The Np reference point may be utilized to report RAN user plane congestion information (RUCI) from the RCAF 260 to the PCRF 225, provision reporting restriction from the PCRF 225 to the RCAF 260, facilitate UE mobility between RCAFs, and remove UE context in the RCAF 260. In some cases, the RCAF 260 may report the RUCI via the Np reference point to the PCRF 225 to enable the PCRF 225 to take RAN user plan congestion status into account for policy decisions. The RUCI may include a user identifier, such as an international mobile subscriber identity (IMSI) identifying UE impacted by congestion, a PDN identifier for which congestion information is reported, and congestion level information of UE impacted by congestion. The PCRF 225 may receive the RUCI from the RCAF 260 as input to make policy decisions that facilitate congestion mitigation.

The SCEF 265 may provide means to securely expose services and capabilities provided by 3GPP network interfaces. An Nt reference point residing between the PCRF 225 and the SCEF 265 may allow the PCRF 225 to report transfer policies to the SCEF 265. The PFDF 270 may store packet flow description (PFD) associated with application identifier(s). An Nu interface between the PFDF 270 and SCEF 265 may allow the PFDF 270 to receive and manage PFDs associated to application identifier(s) from the SCEF 265. The SCEF 265 may provision the PFDs to the PFDF 270 via the Nu reference point. A Gw interface between the PFDF 270 and PCEF 245 may allow the PFDF 270 to transfer PFDs to the PCEF 245 to facilitate accurate application detection by the PCEF 245 (e.g., when the PFDs are managed by a third party service provider). A Gwn interface between the PFDF 270 and the TDF 250 may allow the PFDF 270 to transfer PFDs to the TDF 250 to facilitate accurate application detection by the TDF 250 (e.g., when the PFDs are managed by a third party service provider). In this regard, the PCEF 245 and/or the TDF 250 may support management of PFDs provisioned by the PFDF 270.

The TSSF 275 may receive traffic steering control information from the PCRF 225 and ensure that related traffic steering policy is enforced in an (S)Gi-LAN. The (S)Gi-LAN is a network infrastructure connected to the 3GPP network over an SGi or a Gi reference point that provides various IP-based services. An St reference point between the TSSF 275 and the PCRF 225 may be used to provision the traffic steering control information from the PCRF 225 to the TSSF 275. In some cases, the PCRF 225 may make decisions related to traffic steering policies used to control steering of a user's (e.g., subscriber's) traffic to appropriate (S)Gi-LAN service functions.

The SPR 280 may include subscriber/subscription-related information needed for subscription-based policies and IP-CAN bearer level charging rules by the PCRF 225. For example, the SPR 280 may include subscriber/subscription-related information associated with the user devices 205A-C and/or users of the user devices 205A-C. The subscription profile information may include a subscriber's allowed services, subscriber's allowed QoS (e.g., subscribed guaranteed bandwidth QoS), and subscriber category. An Sp reference point residing between the SPR 280 and the PCRF 225 may allow the PCRF 225 to request subscription information related to the IP-CAN transport level policies from the SPR 280 based on a subscriber identifier, a PDN identifier, and/or other information. In some cases, the SPR 280 may notify the PCRF 225 via the Sp reference point when the subscription information has changed, such as if the PCRF 225 has requested such notifications.

The OCS 285 and OFCS 290 may facilitate online (e.g., pre-paid) charging and offline (e.g., post-paid) charging, respectively. The OCS 285 may trigger the PCEF 245 to initiate an IP-CAN bearer service termination at any point in time. Default OCS and OFCS addresses (e.g., primary address and secondary address) may be locally pre-configured within the PCEF 245. OCS and OFCS addresses may also be passed once per IP-CAN session from the PCRF 225 to the PCEF 245. A Gy reference point residing between the OCS 285 and the PCEF 245 and a Gyn reference point residing between the OCS 285 and the TDF 250 may be utilized to facilitate online charging. A Gz reference point residing between the OFCS 290 and the PCEF 245 and a Gzn reference point residing between the OFCS 290 and the TDF 250 may be utilized to facilitate offline charging.

In some embodiments, data traffic between any two components of the network environment 200 may be monitored and analyzed to detect bursts of traffic and associated burst rates and miss rates and to determine and apply time delays to mitigate such bursts of traffic (e.g., time delays to cause miss rates to drop to zero). As an example, the data traffic may include traffic between UEs and the access network, traffic between the access network and the core network, traffic between components of the core network, traffic between the core network and the external network(s) 220, and so forth. In some aspects, each component may monitor/analyze its one or more transmit ports and/or one or more receive ports on a per-port basis.

With regard to a given network device of the PCC architecture 215, different reference points coupled to the network device may be associated with different data communications. For example, the PCRF 225 may communicate messages with (e.g., receive messages from, transmit messages to) other network devices (e.g., the PCEF 245, AF 255, etc.). As shown in FIG. 2, the PCRF 225 may communicate with the PCEF 245 and the AF 255 via the Gx reference point and the Rx reference point, respectively, among other network devices and associated reference points.

Communications over different reference points may be associated with different traffic characteristics, such as different message rates and/or miss rates. On the same reference point, message rates and miss rates associated with messages transmitted by a first network device (e.g., the PCRF 225) to a second network device (e.g., the PCEF 245) may be different from messages rates and miss rates associated with messages received by the first network device from the second network device. As such, different time spacing (e.g., time delays) may be applied at different reference points and/or within the same reference point (e.g., different time delay between receiver-side and sender-side of the reference point). Although devices such as the PCRF 225 may be utilized as a sender device when transmitting messages and a receiver device when receiving messages, in some cases a network device may operate exclusively as a sender device or exclusively as a receiver device.

Traffic bursts may occur between the various components of the network environment 200. In some aspects, a burst of traffic experienced by one component may propagate throughout various other components of the network environment 200, thus causing a chain performance impact throughout the network environment 200. As one general example, the access network may receive a burst of user traffic from UEs (e.g., the user devices 205A-C and/or other user devices). The access network may generate and transmit messages responsive to the burst of user traffic to the S-GW 230 via the S1-u reference points. The S-GW 230 may receive the messages from the access network and generate and transmit appropriate messages to the PCRF 225 (e.g., via the Gxx reference point) and/or the P-GW 240 (e.g., via the S5/S8 interface). The PCEF 245 of the P-GW 240 may generate and transmit appropriate messages to the PCRF 225 (e.g., via the Gx reference point) and the external network(s) 220 (e.g., via the SGi reference point and in response to messages from the PCRF 225). The PCRF 225 may process the messages from the S-GW 230 and/or PCEF 245 and generate appropriate messages (e.g., policy decision messages) and transmit them to the S-GW 230 and the PCEF 245. For each of these components (e.g., S-GW 230, PCRF 225, PCEF 245), data received by and/or transmitted by each component may be monitored/analyzed to detect for traffic bursts and time delay(s) applied as appropriate to accommodate any detected traffic bursts.

Bursts of traffic are generally associated with a sudden increase in message rate relative to normal traffic expected of a message sender and/or a message receiver and may be associated with an event. As one example, a natural disaster may cause the burst of user traffic, which may include requests for texting services, VoIP services, and/or other services. As another example, a portion of the access network and/or core network may be shutdown, failing, or otherwise inoperable, causing bursts of user traffic to propagate through functioning portions of the access network and/or core network.

As one example of bursty traffic, in a web browsing application, the PCEF 245 may detect multiple 5-tuple flows from a web page open by a user device, where the web page has multiple icons (e.g., such as a web page that includes advertisements from various sources) that cause source port changes. The multiple 5-tuple flows may be provided to the PCEF 245 by the S-GW 230 via an S5/S8 reference point. The PCEF 245 may report the multiple detections to the PCRF 225 to facilitate consumption of the web page's contents by a user of the user device. In some cases, the PCEF 245 may be implemented using a server (e.g., non-virtualized), as a vPCEF defined by a VNF server (e.g., in a computing cloud), or a combination thereof. In some cases, the PCRF may be implemented using a server (e.g., non-virtualized), as a vPCRF defined by a VNF server (e.g., in a computing cloud), or a combination thereof. Since the PCEF 245 detected the multiple 5-tuple flows within a very short time (e.g., almost simultaneously), the PCEF 245 may accordingly report the multiple detections in a very short time (e.g., almost simultaneously). Applying a time delay at the PCEF 245 and/or the PCRF 225 may facilitate handling of messaging associated with the web browsing application.

As another example of bursty traffic, components of the access network and the core network may experience a burst of traffic in response to an outage of a wired LAN device. Due to the outage, data traffic originally handled by the wired LAN device may be handed over to the access network and core network for handling. In a case that the wired LAN device's outage causes 300 user requests to be received by the PCRF 225 and the PCRF 225 issues the policy to build each new EPS bearer in around 3 ms, the PCRF 225 may apply a time delay of 3 ms in order to issue the policy to establish an EPS bearer for each of the 300 user requests over a duration of around 900 ms (e.g., 300 EPS bearers at 3 ms each). In this case, after around 1 second, the PCRF 225 has mitigated the bursty traffic condition caused by the outage.

Using various embodiments, time delay may be applied to handle traffic bursts between any receiver-sender pair on a per-port basis and/or per-interface basis. The time delay to be applied for a receiver-sender pair may be based on message rates and miss rates associated with messaging for the receiver-sender pair. A sender device and/or a receiver device may apply a time delay. The time delay applied by the sender device may be different from the time delay applied by the receiver device. Although the network environment 200 is implemented to form part of a cellular network, time delay may be applied in other types of network environments, including wired network environments and/or non-cellular networks (e.g., Wi-Fi).

Figure 3:
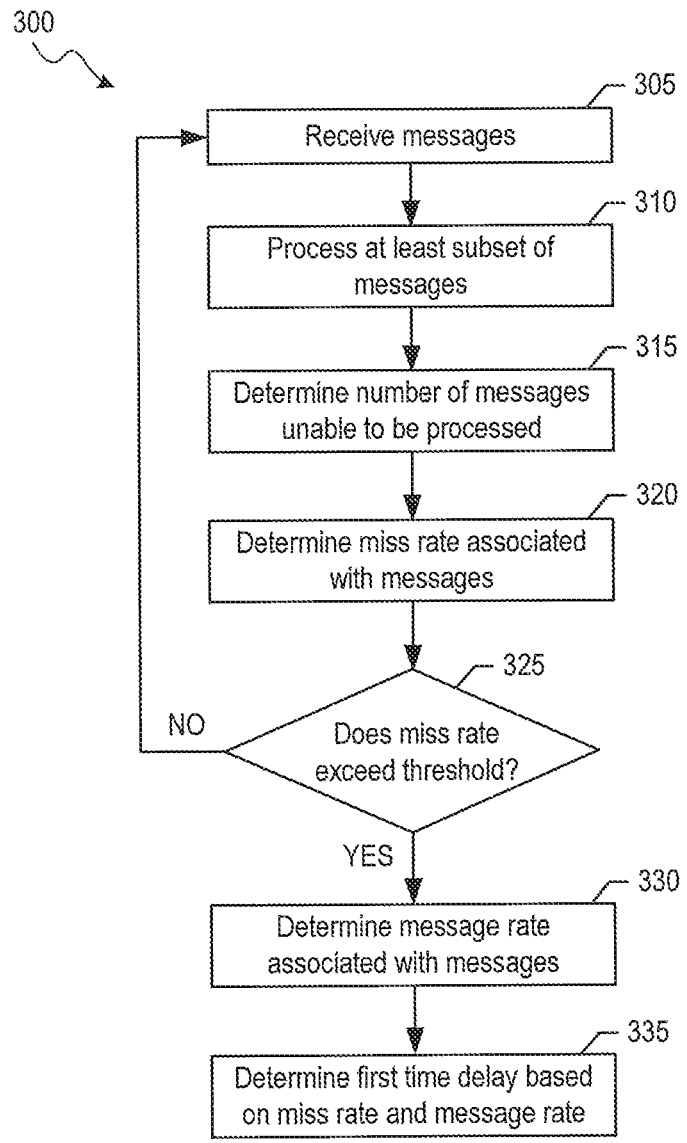
FIGS. 3 and 4 illustrate flow diagrams of processes for facilitating receiver-side time-spaced messaging in accordance with one or more embodiments of the present disclosure.
Figure 4:
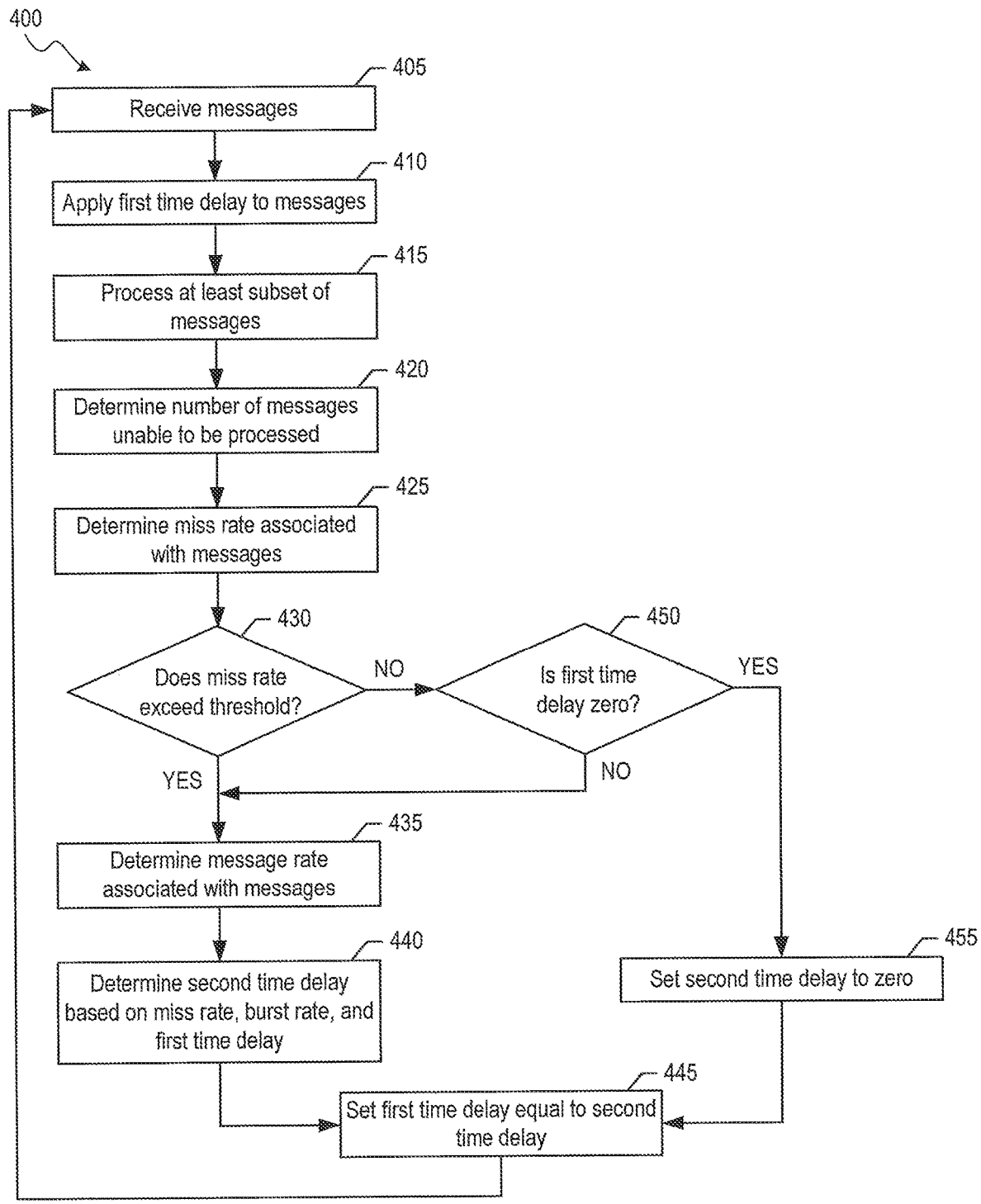

FIGS. 3 and 4 illustrate a flow diagram of an example of a process 300 and 400, respectively, for facilitating receiver-side time-spaced messaging in accordance with one or more embodiments of the present disclosure. The processes 300 and 400 are described herein with reference to the example cellular network environment 200 of FIG. 2. However, the processes 300 and 400 are not limited to the cellular network environment 200 of FIG. 2. Note that one or more operations in each of FIGS. 3 and 4 may be combined, omitted, and/or performed in a different order as desired.

For explanatory purposes, the processes 300 and 400 are described with reference to the PCRF 225 as a first network device and the PCEF 245 as a second network device. In the processes 300 and 400, the PCEF 245 is a transmitting device to transmit messages to the PCRF 225 and the PCRF 225 is a receiving device to receive the messages from the PCEF 245 and process the messages. In this case, for example, the processes 300 and 400 may facilitate handling of messages by the PCRF 225 that are received via the Gx reference point. In other cases, the processes 300 and 400 may apply to other reference points or other receiving ports of one or more network devices. It is noted that an index/identifier (e.g., first network device, second network device, first time delay, etc.) may be arbitrary and utilized for convenience in differentiating network devices, time delays, etc.

With reference to FIG. 3, at block 305, the PCRF 225 (e.g., the first network device) receives a plurality of messages. The messages may be received from the PCEF 245 (e.g., the second network device). For example, the PCRF 225 may receive the messages from the PCEF 245 via the Gx reference point. The messages may include requests from the PCEF 245 for PCC/ADC decisions from the PCRF 225 and reports from the PCEF 245 pertaining to a start and a stop of detected applications and transfer of service data flow descriptions and application instance identifiers for detected applications. For example, for a web browsing application (e.g., web browser) running on the user device 205A, the plurality of messages transmitted by the PCEF 245 may include messages indicative of multiple detections of 5-tuple flows from a web page (e.g., hosted by the server 110A of FIG. 1) opened by the user device 205A in the web browsing application.

At block 310, the PCRF 225 processes at least a subset of the messages. In some cases, the messages may be stored in a queue. After one message is processed, another message in the queue may be retrieved from the queue by the PCRF 225 and processed by the PCRF 225. The queue may be implemented with local memory of the PCRF 225, memory remote from the PCRF 225, and/or other memory coupled to or otherwise accessible by the PCRF 225. In some cases, the queue may have a configurable/adjustable size to facilitate data buffering for purposes of processing the messages.

To process the messages, the PCRF 225 may determine appropriate actions to be performed for the messages (e.g., based on message content and/or message type) and perform the actions. In an aspect, the messages may include service requests from the PCEF 245, and the PCRF 225 may process the service requests and provide service response to the PCEF 245. For example, the PCRF 225 may generate policy decisions based on content of the messages. The PCRF 225 may then transmit messages containing the policy decisions to the PCEF 245 and/or another network device. For example, with continued reference to the web browsing application running on the user device 205A, the PCRF 225 may generate messages containing the policy decisions that the PCEF 245 utilizes to establish appropriate radio bearers to support the web browsing application for the user device 205A.

At block 315, the PCRF 225 determines a number of the messages that the PCRF 225 is unable to process. In some cases, the PCRF 225 determines the number of the messages that the PCRF 225 is unable to process within a threshold time duration after receipt of a message. In this regard, for each message received at block 305, the PCRF 225 may associate a time of receipt (e.g., via a timestamp) with the received message and determine whether the message is processed within a threshold time duration of the message having been received by the PCRF 225. As one example, the threshold time duration may be around 2 seconds. At block 320, the PCRF 225 determines a miss rate associated with the plurality of messages received at block 305 based on the number determined at block 315. In some cases, the miss rate may be, or may be indicative of, the number of the messages per unit of time that the PCRF 225 is unable to process (e.g., within the threshold time duration after receipt of the message in some implementations). For example, each of the messages that the PCRF 225 is unable to process may be considered a miss.

At block 325, the PCRF 225 determines whether the miss rate exceeds the threshold miss rate. As described above, in an embodiment, the threshold miss rate may be zero such that any non-zero miss rate detected by the PCRF 225 causes the PCRF 225 to mitigate the non-zero miss rate by applying a time delay. If the miss rate does not exceed the threshold miss rate, the process 300 proceeds back to block 305. In this case, the PCRF 225 may continue to operate in a normal traffic mode. In the normal traffic mode, the PCRF 225 may apply a zero time delay (e.g., also referred to as not applying a time delay) to messages received by the PCRF 225.

If the miss rate exceeds the threshold miss rate, the process 300 proceeds to block 330. In an aspect, if the miss rate exceeds the threshold miss rate, the PCRF 225 may transition from operating in a normal traffic mode (e.g., in which no time delay is applied to messages received by the PCRF 225) to operating in a bursty traffic mode. At block 330, the PCRF 225 determines a message rate associated with the messages received at block 305. The message rate provides the number of messages received by the PCRF 225 (e.g., at block 305) per unit of time. In some cases, since the miss rate exceeds the threshold miss rate, the message rate may be referred to as a burst rate (e.g., a message rate associated with the burst of traffic). In an aspect, the message rate may be determined prior to block 325. At block 335, the PCRF 225 determines a first time delay based on the miss rate (e.g., determined at block 320) and the message rate (e.g., determined at block 330). The first time delay may be applied to subsequent messages to be received and serviced by the PCRF 225.

Turning now to the process 400 of FIG. 4, for explanatory purposes, the process 400 is performed after block 335 of the process 300. However, in some cases, the process 400 need not follow block 335 of the process 300. Following block 335, the PCRF 225 is in the bursty traffic mode. At block 405, the PCRF 225 (e.g., the first network device) receives a plurality of messages. The messages may be received from the PCEF 245 (e.g., the second network device). For example, the PCRF 225 may receive the messages from the PCEF 245 via the Gx reference point.

At block 410, the PCRF 225 applies the first time delay (e.g., determined at block 335 of FIG. 3) to the received messages. At block 415, the PCRF 225 processes at least a subset of the messages according to the first time delay. The PCRF 225 may apply the first time delay by scheduling the processing of each of the messages by the PCRF 225 according to the first time delay. The first time delay may be applied to the received messages to accommodate the burst of traffic (e.g., by reducing the miss rate).

The messages may be stored in a queue, and each message may be processed by the PCRF 225 upon retrieval from the queue. The messages may be stored in the queue in the order that the messages are received by the PCRF 225. The queue may be implemented with local memory of the PCRF 225, memory remote from the PCRF 225, and/or other memory coupled to or otherwise accessible by the PCRF 225. In some cases, the queue may have a configurable size to facilitate data buffering for purposes of processing the messages. For example, in response to a larger burst rate (e.g., larger number of messages in a unit of time) and/or a higher miss rate, a size of the queue may be increased to allow storage and subsequent retrieval of the messages for processing by the PCRF 225.

In some aspects, to apply the first time delay, the PCRF 225 may space out the processing of the messages in time based on the first time delay. As an example, if the first time delay is 2 ms, the PCRF 225 may process one message every 2 ms. In this example, at a time $t=t_0$, the PCRF 225 may initiate retrieval from the queue and processing of a first message; at a time $t=t_0+2$ ms, the PCRF 225 may initiate retrieval from the queue and processing of a second message; at a time $t=t_0+4$ ms, the PCRF 225 may initiate retrieval from the queue and processing of a third message; and so on.

At block 420, the PCRF 225 determines a number of the messages that the PCRF 225 is unable to process. In some aspects, the PCRF 225 may determine the number of the messages that the PCRF 225 is unable to process within a threshold time duration after receipt of a message. In some cases, the threshold time duration may be based on the first time delay applied to the messages, in which case the threshold time duration before a message is associated with a miss takes into consideration the first time delay applied to the message. At block 425, the PCRF 225 determines a miss rate associated with the plurality of messages received at block 405 based on the number determined at block 420. In some cases, the miss rate may be, or may be indicative of, the number of the messages per unit time that the PCRF 225 is unable to process (e.g., within the threshold time duration after receipt of the message). For example, each of the messages that the PCRF 225 is unable to process may be considered a miss.

At block 430, the PCRF 225 determines whether the miss rate exceeds the threshold miss rate. As described above, in an embodiment, the threshold miss rate may be zero such that any non-zero miss rate detected by the PCRF 225 causes the PCRF 225 to mitigate the non-zero miss rate. If the miss rate exceeds the threshold miss rate (e.g., the PCRF 225 continues to operate in the bursty traffic mode), the process 400 proceeds to block 435. At block 435, the PCRF 225 determines a message rate (e.g., burst rate) associated with the messages received at block 405. At block 440, the PCRF 225 determines a second time delay based on the miss rate, message rate, and first time delay. In this regard, the PCRF 225 may adjust the first time delay based on the miss rate and the message rate of the messages received at block 405 to obtain the second time delay. At block 445, the PCRF 225 sets the first time delay equal to the second time delay. The process 400 proceeds to block 405 to accommodate subsequent messages to be received and serviced by the PCRF 225 based on the first time delay set at block 445.

If the miss rate does not exceed the threshold miss rate, the process 400 proceeds to block 450. At block 450, the PCRF 225 determines whether the first time delay is zero. If the first time delay is not zero, the process 400 proceeds to block 435. If the first time delay is zero, the process 400 proceeds to block 455. At block 455, the PCRF 225 sets the second time delay to zero. In this case, the PCRF 225 is in the normal traffic mode. The process 400 then proceeds to block 445.

As such, each iteration of the process 400 involves applying a current time delay to messages to be processed, determining a miss rate and message rate associated with the messages, and updating the current time delay to be applied to subsequent messages based on the miss rate and message rate. In an aspect, the miss rate and message rate may be determined in real-time or near real-time such that the time delay can be automatically tuned to accommodate bursty messaging. The same time delay may continue to be applied by the PCRF 225 until an updated time delay is set. The current time delay may be updated to a zero time delay in the case that the PCRF 225 transitions from the bursty traffic mode to the normal traffic mode. In an embodiment, the process 300 may be considered a special case of the process 400 in which the first time delay is initially zero (e.g., zero time delay is applied to the messages received at block 305).

Figure 5:
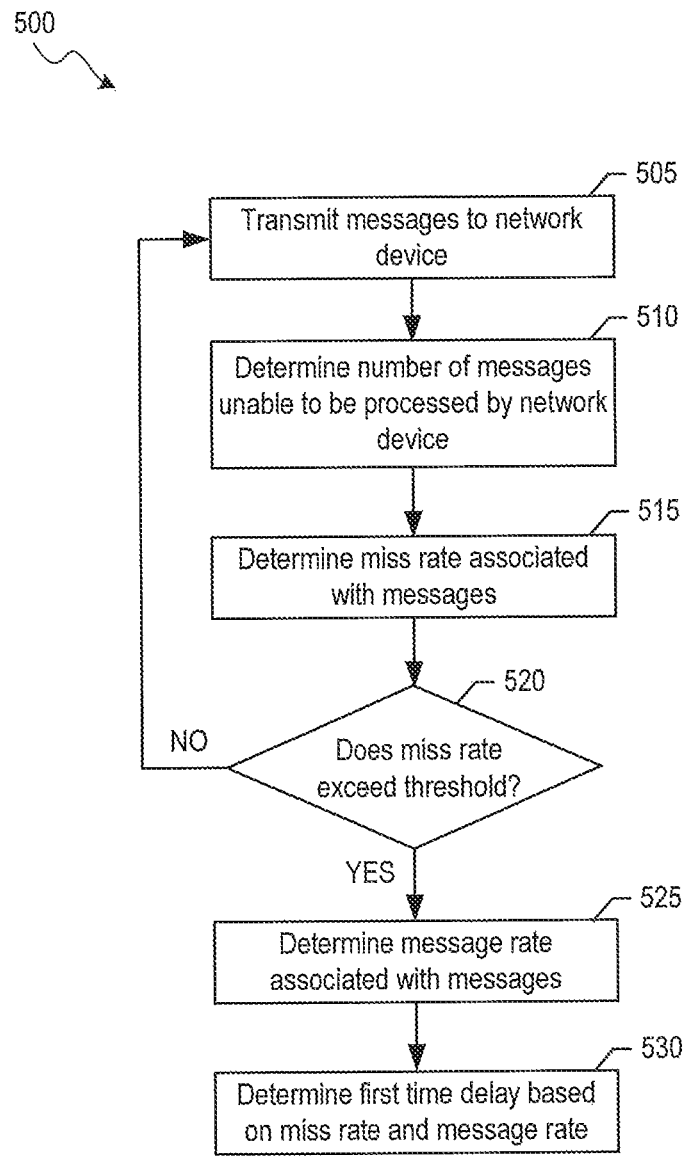
FIGS. 5 and 6 illustrate flow diagrams of processes for facilitating sender-side time-spaced messaging in accordance with one or more embodiments of the present disclosure.
Figure 6:
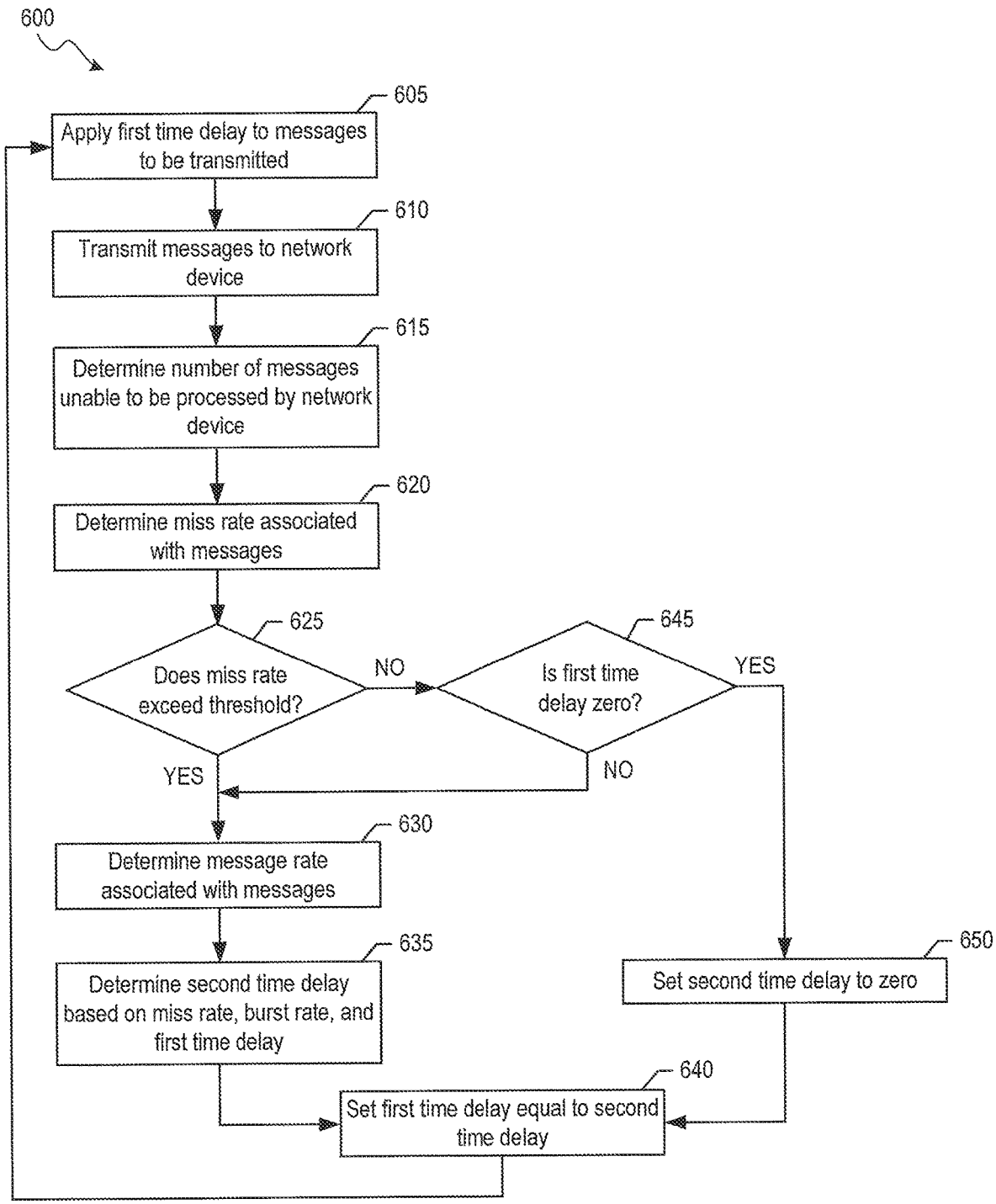

FIGS. 5 and 6 illustrate a flow diagram of an example of a process 500 and 600, respectively, for facilitating sender-side time-spaced messaging in accordance with one or more embodiments of the present disclosure. The processes 500 and 600 are described herein with reference to the example cellular network environment 200 of FIG. 2. However, the processes 500 and 600 are not limited to the cellular network environment 200 of FIG. 2. Note that one or more operations in each of FIGS. 5 and 6 may be combined, omitted, and/or performed in a different order as desired.

For explanatory purposes, the processes 500 and 600 are described with reference to the PCEF 245 as a first network device and the PCRF 225 as a second network device. In the processes 500 and 600, the PCEF 245 is a transmitting device to transmit messages to the PCRF 225 and the PCRF 225 is a receiving device to receive the messages from the PCEF 245 and process the messages. In this case, for example, the processes 500 and 600 may facilitate handling of messages to be transmitted by the PCEF 245 to the PCRF 225 via the Gx reference point. The description of FIG. 3 generally applies to FIG. 5, with examples of differences between FIG. 3 and FIG. 5 and other description provided herein. The description of FIG. 4 generally applies to FIG. 6, with examples of differences between FIG. 4 and FIG. 6 and other description provided herein. It is noted that an index/identifier (e.g., first network device, second network device, first time delay, etc.) may be arbitrary and utilized for convenience in differentiating network devices, time delays, etc.

At block 505, the PCEF 245 (e.g., the first network device) transmits a plurality of messages to the PCRF 225 (e.g., the second network device). As indicated previously, for example, the messages may include requests from the PCEF 245 for PCC/ADC decisions from the PCRF 225 to facilitate establishment of radio bearers for UEs (e.g., the user device 205A) by the PCEF 245.

At block 510, the PCEF 245 determines a number of the messages that the PCRF 225 is unable to process. For example, for a given message transmitted by the PCEF 245 and received by the PCRF 225, the PCRF 225 may transmit a message to the PCEF 245 to indicate to the PCEF 245 that the PCRF 225 is unable to process the message. In this example, the message transmitted by the PCRF 225 may include a process error code or otherwise any data indicative of the PCRF 225 not being able to process the message. As another example, a lack of a response (e.g., within a threshold amount of time of the message having been transmitted by the PCEF 245) from the PCRF 225 may also be indicative of the PCRF 225 being unable to process a message. For instance, the lack of a response may be a lack of an ACK message and/or a lack of a message including an indication (e.g., process error code) that the PCRF 225 is unable to process the message. At block 515, the PCEF 245 determines a miss rate associated with the plurality of messages transmitted at block 505 based on the number determined at block 510. In some cases, the miss rate may be, or may be indicative of, the number of the messages per unit of time that the PCRF 225 is unable to process (e.g., as determined by the PCEF 245). For example, each of the messages that the PCRF 225 is unable to process may be considered a miss.

At block 520, the PCEF 245 determines whether the miss rate exceeds a threshold miss rate. As described above, in an embodiment, the threshold miss rate may be zero such that any non-zero miss rate detected by the PCEF 245 causes the PCEF 245 to mitigate the non-zero miss rate. If the miss rate does not exceed the threshold miss rate, the process 500 proceeds back to block 505. In this case, the PCEF 245 may continue to operate in the normal traffic mode.

If the miss rate exceeds the threshold miss rate, the process 500 proceeds to block 525. In an aspect, if the miss rate exceeds the threshold miss rate, the PCEF 245 may transition from operating in the normal traffic mode (e.g., in which no time delay is applied to messages transmitted by the PCEF 245) to operating in the bursty traffic mode. At block 525, the PCEF 245 determines a message rate associated with the messages transmitted at block 505. The message rate provides the number of messages transmitted by the PCEF 245 per unit of time. In some cases, since the miss rate exceeds the threshold miss rate, the message rate may be referred to as a burst rate (e.g., a message rate associated with the burst of traffic). In an aspect, the message rate may be determined prior to block 520. At block 530, the PCRF 225 determines a first time delay based on the miss rate (e.g., determined at block 515) and the message rate (e.g., determined at block 525). The first time delay may be applied to subsequent messages to be transmitted by the PCEF 245.

Turning now to the process 600 of FIG. 6, for explanatory purposes, the process 600 is performed after block 530 of the process 500. However, in some cases, the process 600 need not follow block 530 of the process 500. Following block 530, the PCRF 225 is in the bursty traffic mode. At block 605, the PCEF 245 (e.g., the first network device) applies the first time delay (e.g., determined at block 530 at FIG. 5) to messages to be transmitted to the PCRF 225 (e.g., the second network device). In some aspects, the PCEF 245 may apply the first time delay by scheduling transmission of each of the messages by the PCEF 245 according to the first time delay to obtain a scheduled set of messages. The first time delay may be applied to the transmitted messages to facilitate processing of the burst of traffic by the PCRF 225. The first time delay may help reduce the miss rate associated with the messages transmitted by the PCEF 245 to the PCRF 225.

The messages or data associated with the messages may be stored in a queue (e.g., in the order that the messages are to be transmitted by the PCEF 245) and retrieved by the PCEF 245 for transmission. The queue may be implemented with local memory of the PCEF 245, memory remote from the PCEF 245, and/or other memory coupled to or otherwise accessible by the PCEF 245. In some cases, the queue may have a configurable size to facilitate data buffering for purposes of preparing and transmitting the messages. For example, in response to a larger number of messages to be transmitted and/or a higher miss rate, a size of the queue may be increased to allow storage and subsequent retrieval of the messages for transmission by the PCEF 245.

In some aspects, to apply the first time delay, the PCEF 245 may space out the transmission of the messages in time based on the first time delay. As an example, if the first time delay is 3 ms, the PCEF 245 may transmit one message every 3 ms. In this example, at a time $t=t_0$, the PCEF 245 may initiate retrieval from the queue and transmission of a first message; at a time $t=t_0+3$ ms, the PCEF 245 may initiate retrieval from the queue and transmission of a second message; at a time $t=t_0+6$ ms, the PCEF 245 may initiate retrieval from the queue and transmission of a third message; and so on. In some cases, the queue may contain data to be included in the transmitted message. In these cases, with continued reference to the previous example, at time $t=t_0$, the PCEF 245 may initiate transmission of a first message by retrieving the data to be contained in the first message from the queue and generating the first message having an appropriate format (e.g., packet format) to be transmitted to the PCRF 225.

At block 610, the PCEF 245 transmits the plurality of messages to the PCRF 225 according to the first time delay. For example, the PCEF 245 may transmit the messages to the PCRF 225 via the Gx reference point. At block 615, the PCEF 245 determines a number of the messages transmitted by the PCEF 245 that the PCRF 225 is unable to process. At block 620, the PCEF 245 determines a miss rate associated with the plurality of messages transmitted at block 610 based on the number determined at block 615. In some cases, the miss rate may be, or may be indicative of, the number of the messages that the PCRF 225 is unable to process. For example, each of the messages that the PCRF 225 is unable to process may be considered a miss.

At block 625, the PCEF 245 determines whether the miss rate exceeds the threshold miss rate. As described above, in an embodiment, the threshold miss rate may be zero such that any non-zero miss rate associated with the PCRF 225 detected by the PCEF 245 causes the PCEF 245 to mitigate the non-zero miss rate. If the miss rate exceeds the threshold miss rate (e.g., the PCEF 245 continues to operate in the bursty traffic mode), the process 600 proceeds to block 630.

At block 630, the PCEF 245 determines a message rate (e.g., burst rate) associated with the messages transmitted at block 610. At block 635, the PCEF 245 determines a second time delay based on the miss rate, message rate, and first time delay. In this regard, the PCEF 245 may adjust the first time delay based on the miss rate and the message rate of the messages transmitted at block 610 to obtain the second time delay. At block 640, the PCEF 245 sets the first time delay equal to the second time delay. The process 600 proceeds to block 605 to accommodate subsequent messages to be transmitted by the PCEF 245 based on the first time delay set at block 640.

If the miss rate does not exceed the threshold miss rate, the process 600 proceeds to block 645. At block 645, the PCEF 245 determines whether the first time delay is zero. If the first time delay is not zero, the process 600 proceeds to block 630. If the first time delay is zero, the process 600 proceeds to block 650. At block 650, the PCEF 245 sets the second time delay to zero. The process 600 then proceeds to block 640.

As such, each iteration of the process 600 involves applying a current time delay to messages to be transmitted, determining a miss rate and message rate associated with the messages, and updating the current time delay to be applied to subsequent messages based on the miss rate and message rate. In an aspect, the miss rate and message rate may be determined in real-time or near real-time by the PCEF 245 such that the time delay can be automatically tuned to accommodate bursty messaging. The same time delay may continue to be applied by the PCEF 245 until an updated time delay is set. The current time delay may be updated to a zero time delay in the case that the PCEF 245 transitions from the bursty traffic mode to the normal traffic mode. In an embodiment, the process 500 may be a special case of the process 600 in which the first time delay is initially zero (e.g., zero time delay is applied to the messages transmitted at block 505).

Although the processes 300, 400, 500, and 600 of FIGS. 3, 4, 5, and 6, respectively, are described with regard to the PCRF 225 as the receiver of messages received from the PCEF 245, the processes 300, 400, 500, and 600 may also apply to the PCRF 225 as the transmitter of messages (e.g., containing policy decision data) to the PCEF 245 in response to those messages received from the PCEF 245 and processed by the PCRF 225.

For example, the PCRF 225 may process the messages received from the PCEF 245 to generate policy decisions (e.g., based on content of the messages). The PCRF 225 may then transmit messages containing the policy decisions to the PCEF 245 and/or another network device. For example, in a web browsing application running on UEs, the PCRF 225 may generate messages containing the policy decisions that the PCEF 245 are to utilize to establish appropriate radio bearers to support the web browsing application for the UEs. In this example, the PCRF 225, as the transmitter, and/or the PCEF 245, as the receiver, may monitor/analyze traffic transmitted by the PCRF 225 to determine whether time delay needs to be applied to the messages, such as to space out transmission of the messages by the PCRF 225 and/or to space out processing of the received messages by the PCEF 245.

In some embodiments, time-spacing may be performed exclusively by the sender device (e.g., time delay applied to messages to be transmitted by the sender), exclusively by the receiver device (e.g., time delay applied to processing of the messages by the receiver), or by the sender device and the receiver device. In some cases, the receiver device may signal to the sender device a time delay to be applied by the sender device (e.g., to messages transmitted by the sender device) to facilitate processing of messages received by the receiver device from the sender device. In some cases, as in the example of the PCRF 225 and the PCEF 245, a network device may be utilized as a sender for some messages and a receiver for other messages. In other cases, a network device may operate exclusively as a sender device or exclusively as a receiver device. More generally, the processes 300, 400, 500, and 600 of FIGS. 3, 4, 5, and 6, respectively, may be performed to implement time-spaced messaging for any receiver-sender pair.

Figure 7:
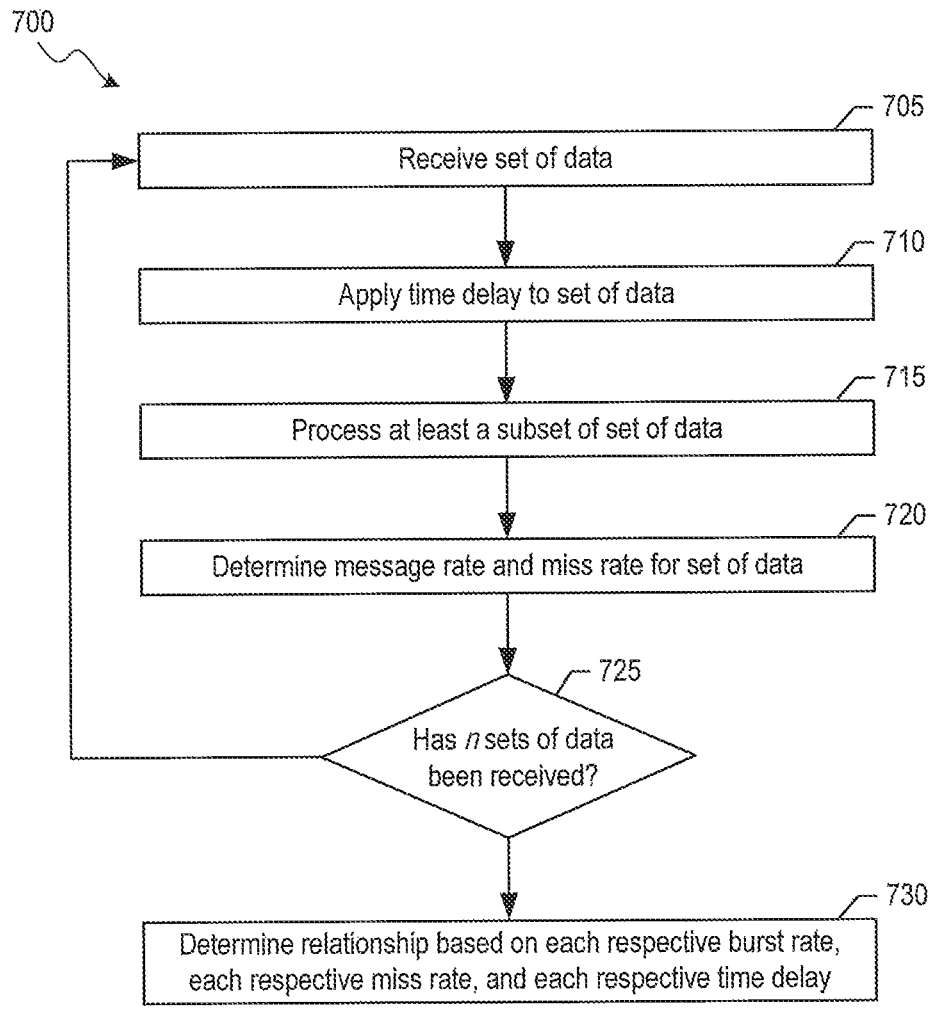
FIG. 7 illustrates a flow diagram of an example of a process for facilitating receiver-side time-spaced messaging in accordance with one or more embodiments of the present disclosure.

FIG. 7 illustrates a flow diagram of an example of a process 700 for facilitating receiver-side time-spaced messaging in accordance with one or more embodiments of the present disclosure. The process 700 is described herein with reference to the example cellular network environment 200 of FIG. 2. For explanatory purposes, the process 700 is described with reference to the PCRF 225 as the receiver device (e.g., for messages received via the Gx reference point). However, the process 700 is not limited to the cellular network environment 200 of FIG. 2. Furthermore, in some cases, a receiver device may include multiple receiving ports and may perform the process 700 on a per-port basis. Note that one or more operations in each of FIG. 7 may be combined, omitted, and/or performed in a different order as desired.

At block 705, the PCRF 225 (e.g., the first network device) receives a set of data. The set of data may include a plurality of messages. In some aspects, each set of data received by the PCRF 225 may include test data (e.g., as part of network testing of the Gx reference point between the PCRF 225 and the PCEF 245), field data (e.g., user-related data during operation of the PCRF 225 and the PCEF 245 to serve UEs), or a combination thereof. For example, in the case that a set of data includes test data, the test data and related characteristics (e.g., message rates) may be defined by a network administrator.

At block 710, the PCRF 225 applies a time delay to the set of data. The time delay may be set based on prior data traffic statistics associated with communications between the PCRF 225 and the PCEF 245. At block 715, the PCRF 225 processes at least a subset of the set of data. At block 720, the PCRF 225 determines a message rate and miss rate associated with the set of data. At block 725, the PCRF 225 determines whether n data sets have been received by the PCRF 225 for purposes of formulating a relationship between the time delay, miss rate, and message rate for the PCRF 225.

If n data sets have been received by the PCRF 225, the process 700 proceeds to block 730. At block 730, the PCRF 225 determines a relationship (e.g., also referred to as a model or an equation) based on a message rate, miss rate, and time delay associated with the data sets. The relationship may be between the time delay, miss rate, and message rate. In some cases, n may be set (e.g., by a network administrator) to an appropriate integer to provide a sufficient amount of data to formulate the relationship between the time delay, miss rate, and message rate. In general, n is at least two. In some cases, a data set may be counted among the n data sets if a non-zero miss rate is associated with the data set. In other cases, the n data sets are n consecutive data sets where each data set is counted among the n data sets regardless of whether the data set is associated with a zero miss rate or a non-zero miss rate. If n data sets have not yet been received by the PCRF 225, the process 700 proceeds to block 705. Blocks 705, 710, 715, and 720 are then performed by the PCRF 225 on a next data set. The time delay applied to each set of data may be the same or different from each other. As an example, the time delay may be set to 1 ms for at least one set of data and 2 ms for at least one other set of data.

In some embodiments, the relationship may be utilized to determine a time delay for a given message rate such that miss rate is minimized. For explanatory purposes, minimal miss rate is assumed to be a zero miss rate. In some cases, the relationship may be utilized to determine the time delay at blocks 335 and 440. In some aspects, the miss rate $M_r$ may be assumed to have a linear relationship with the message rate $B_r$ and the time delay $T_d$, as provided by $$M_r = F(T_d, B_r, X) = aT_d + bB_r \quad (1)$$

where a and b are relational parameters (e.g., also referred to as relational coefficients). In some cases, the relational parameter a is expected to be a negative coefficient such that the miss rate $M_r$ decreases as the time delay $T_d$ increases, and the relational parameter b is expected to a positive coefficient such that the miss rate $M_r$ increases as the burst rate $B_r$ increases.

With the n data sets, the relational parameters a and b may be obtained by solving a system of linear equations with each equation having the form $M_{ri} = F(T_{di}, B_{ri}, X)$ (where $n \geq 2$ and $1 \leq i \leq n$):

$$M_{r1} = aT_{d1} + bB_{r1}$$

$$M_{r2} = aT_{d2} + bB_{r2}$$

$$\vdots$$

$$M_{rn} = aT_{dn} + bB_{rn}$$

which may be provided in matrix form as:

$$M_r = TB\ X \quad (2)$$

where, for $1 \leq i \leq n$, $M_{ri}$, $T_{di}$, and $B_{ri}$ are an $i^{th}$ miss rate, $i^{th}$ time delay, and $i^{th}$ message rate, respectively, associated with an $i^{th}$ data set.

In Equation (2) above, $M_r$ is a miss rate vector of size n×1 provided by $$M_r = [M_{r1} M_{r2} \ldots M_{rn}]^T,$$

where T represents a matrix transpose, TB is a matrix of size n×2 provided by $$TB = \begin{bmatrix} T_{d1} & B_{r1} \\ T_{d2} & B_{r2} \\ \vdots & \vdots \\ T_{dn} & B_{rn} \end{bmatrix},$$

X is a relational parameter vector of size 2×1 provided by $$X = [a\ b]^T \quad (3)$$

A least square solution for the relational parameter vector X can be provided by $$X = [a\ b]^T = [TB^T TB]^{-1} TB^T M_r$$

where −1 and T represent matrix inverse and matrix transpose, respectively. As such, the PCRF 225 may be characterized by the relational parameters a and b.

The relationship between the time delay and the burst rate where $M_r$ is minimized to zero may be provided by $$T_d = -\frac{b}{a} B_r \quad (4)$$

In some embodiments, the PCRF 225 may determine the time delay at block 440 using the relationship. In the foregoing, the function F is assumed to be linear. The linear assumption for F is utilized in many embodiments since message processing time generally has a linear relationship to a number of messages being processed in a computing system. In some cases, any non-linear component may have a negligible effect. In other embodiments, the miss rate $M_r$ may have a non-linear relationship with the message rate $B_r$ and the time delay $T_d$. In these embodiments, F is a non-linear function and non-linear least squares or other non-linear methods may be utilized.

As an example, Table 1 provides bursty messaging data measurement for a sender server.

TABLE 1

Example of bursty messaging characteristics for a sender server

| Data Set # | $M_r$ (messages/ms) | $T_d$ (ms) | $B_r$ (messages/ms) |
|---|---|---|---|
| 1 | 0 | 1 | 3 |
| 2 | 1 | 1 | 4 |
| 3 | 2 | 1 | 5 |
| 4 | 4 | 1 | 6 |

In this example:

$$M_r = [0\ 1\ 2\ 4]^T$$

$$TB = \begin{bmatrix} 1 & 3 \\ 1 & 4 \\ 1 & 5 \\ 1 & 6 \end{bmatrix}$$

By solving Equation (3), a=−3.9 and b=1.2. By solving Equation (4), $T_d \approx 0.3\ B_r$ where $T_d$ has units of ms and $B_r$ has units of messages/ms. As an example, if $B_r$=10 messages/ms, $T_d \approx 3$ ms.

Although the example above has two relational parameters a and b, in some embodiments $M_r = F(T_d, B_r, X)$ may be formulated such that F is a function (e.g., linear or non-linear) with a set of relational parameters $X = [x_1, x_2, \ldots, x_p]$. In this case, p is an integer less than or equal to n. In some cases, the relationship may be adjusted as appropriate to mitigate traffic bursts. The relationship may be adjusted periodically, in response to administrator input, in response to the traffic bursts not being mitigated (e.g., miss rate is not minimized despite application of time delays determined using the relationship), and/or in response to network performance being suboptimal (e.g., applied time delay is not optimal and adversely affects network performance).

For example, the relational parameters (e.g., a, b) may be adjusted and/or an offset factor may be applied, such as to mitigate traffic bursts and/or improve network performance. In this example, in one case, if the network device determines that the miss rate is determined to reduce to zero when an additional millisecond of time delay is added, then the relationship may be adjusted such that $$T_d = -\frac{b}{a} B_r + 1.$$

In another case, if the network device determines that the traffic bursts can be mitigated even if all applied time delays are reduced by 2 ms, then the relationship may be adjusted such that $$T_d = -\frac{b}{a}B_r - 2$$

to allow for higher network performance. Further and/or different adjustments can be made to the relationship by monitoring the message rate and miss rate in response to an applied time delay.

Figure 8:
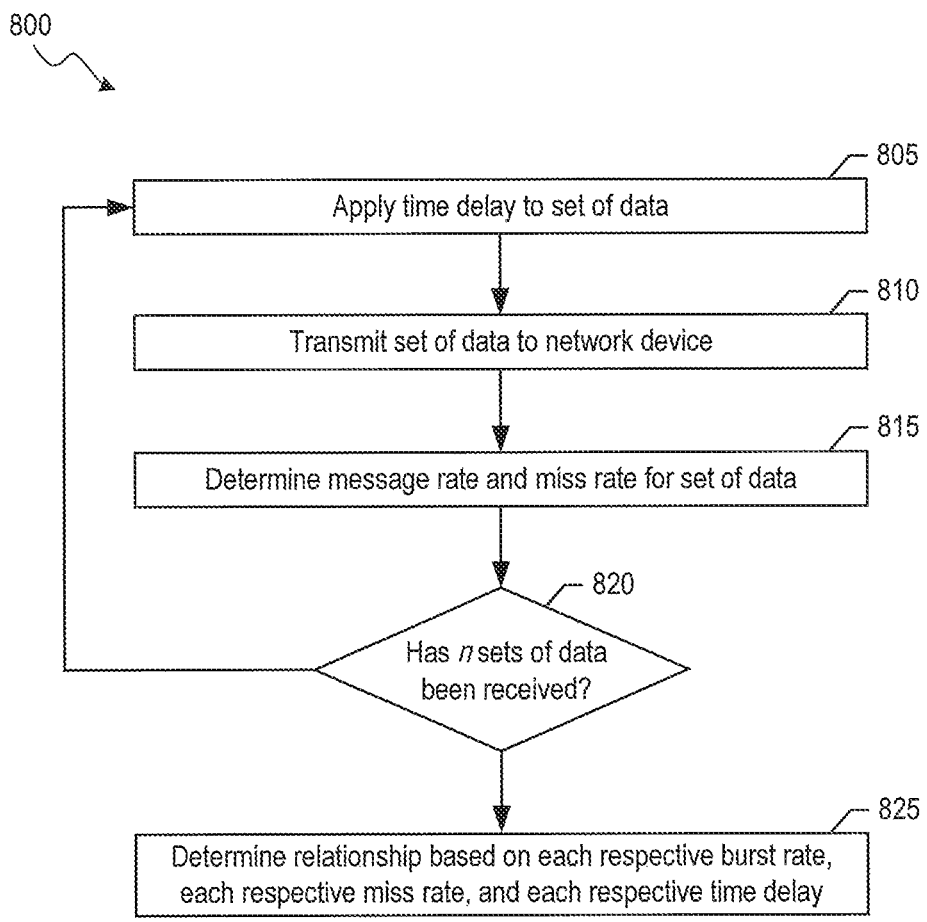
FIG. 8 illustrates a flow diagram of an example of a process for facilitating sender-side time-spaced messaging in accordance with one or more embodiments of the present disclosure.

FIG. 8 illustrates a flow diagram of an example of a process 800 for facilitating sender-side time-spaced messaging in accordance with one or more embodiments of the present disclosure. The process 800 is described herein with reference to the example cellular network environment 200 of FIG. 2. For explanatory purposes, the process 800 is described with reference to the PCEF 245 as the transmitter device and the first network device (e.g., for messages transmitted via the Gx reference point). However, the process 800 is not limited to the cellular network environment 200 of FIG. 2. Furthermore, in some cases, a transmitter device may include multiple transmitting ports and may perform the process 800 on a per-port basis. Note that one or more operations in each of FIG. 8 may be combined, omitted, and/or performed in a different order as desired. The description of FIG. 7 generally applies to FIG. 8, with examples of differences between FIG. 7 and FIG. 8 and other description provided herein.

At block 805, the PCEF 245 (e.g., the first network device) applies a time delay to a set of data to be transmitted. The set of data may include a plurality of messages. In some aspects, each set of data to be transmitted by the PCEF 245 may include test data, field data, or a combination thereof. At block 810, the PCEF 245 transmits the set of data to the PCRF 225 (e.g., the second network device). At block 815, the PCEF 245 determines a message rate and miss rate associated with the set of data. At block 820, the PCEF 245 determines whether n data sets have been transmitted by the PCEF 245 to the PCRF 225 for purposes of formulating a relationship between the time delay, miss rate, and message rate for the PCEF 245. In some cases, n may be set (e.g., by a network administrator) to an appropriate integer to provide sufficient amount of data to formulate the relationship between the time delay, miss rate, and message rate. In general, n is at least 2. In some cases, a data set may be counted among the n data sets if a non-zero miss rate is associated with the data set. In other cases, the n data sets are n consecutive data sets where each data set is counted among the n data sets regardless of whether the data set is associated with a zero miss rate or a non-zero miss rate. If n data sets have not yet been transmitted by the PCEF 245, the process 800 proceeds to block 805. Blocks 805, 810, and 815 are then performed by the PCEF 245 on a next data set. The time delay applied to each set of data may be the same or different from each other.

If n data sets have been received by the PCEF 245, the process 800 proceeds to block 825. At block 825, the PCEF 245 determines a relationship based on the message rates, miss rates, and time delays associated with the data sets. The relationship may be utilized to determine the time delay at block 825. Equations (1)-(4) (and other equations) described with reference to the process 700 of FIG. 7 also apply to the process 800 of FIG. 8. In FIG. 7, the message rate is a rate at which messages are received by the PCRF 225, the miss rate is indicative of a number of messages the PCRF 225 is unable to process per unit of time, and the time delay is applied to the messages received by the PCRF 225. In FIG. 8, the message rate is a rate at which messages are transmitted by the PCEF 245 to the PCRF 225, the miss rate is indicative of a number of messages the PCRF 225 is unable to process per unit of time, and the time delay is applied to the messages transmitted by the PCEF 245 to the PCRF 225.

In some embodiments, the time delay may be determined online or offline. Data buffering and sizing of a queue may be proportional to the time delay and/or the message rate. In an online implementation, a network device may self-set/self-tune the time delay based on real-time (e.g., or near real-time) bursty data measurements. In an offline implementation, the time delay may be determined offline based on bursty messaging statistics (e.g., relating message rate, miss rate, and time delay) measured from a network element, server, and/or function and set the time delay for the network element, server, and/or function via a configuration parameter. In some cases, the offline time delay may be determined to cover worst-case messaging bursty conditions.

It is noted that FIGS. 7 and 8 provide examples in which a network device may determine a time delay based on an equation. In some cases, the network device may store a lookup table with different values of time delay to be applied based on different combinations of message rates and miss rates. Values of the lookup table may be determined based on equations and/or empirical data. Other manners by which to determine a time delay based on a message rate and a miss rate may also be utilized alternatively or in addition to the foregoing examples.

It is also noted that the processes 300, 400, 500, 600, 700, and 800 of FIGS. 3, 4, 5, 6, 7, and 8, respectively, may be performed to implement time-spaced messaging for any receiver-sender pair. In an aspect, a network device may be utilized as a receiver device of some messages and a sender device of other messages. In this aspect, the network device, as the receiver device, may perform the processes 300, 400, and/or 700 to facilitate time-spaced messaging of messages received by the network device; and the network device, as the sender device, may perform the processes 500, 600, and/or 800 to facilitate time-spaced messaging of messages transmitted by the network device. The processes 300, 400, and 700 may be performed on a per-receiver port basis. The processes 400, 500, and/or 800 may be performed on a per-sender port basis.

Figure 9:
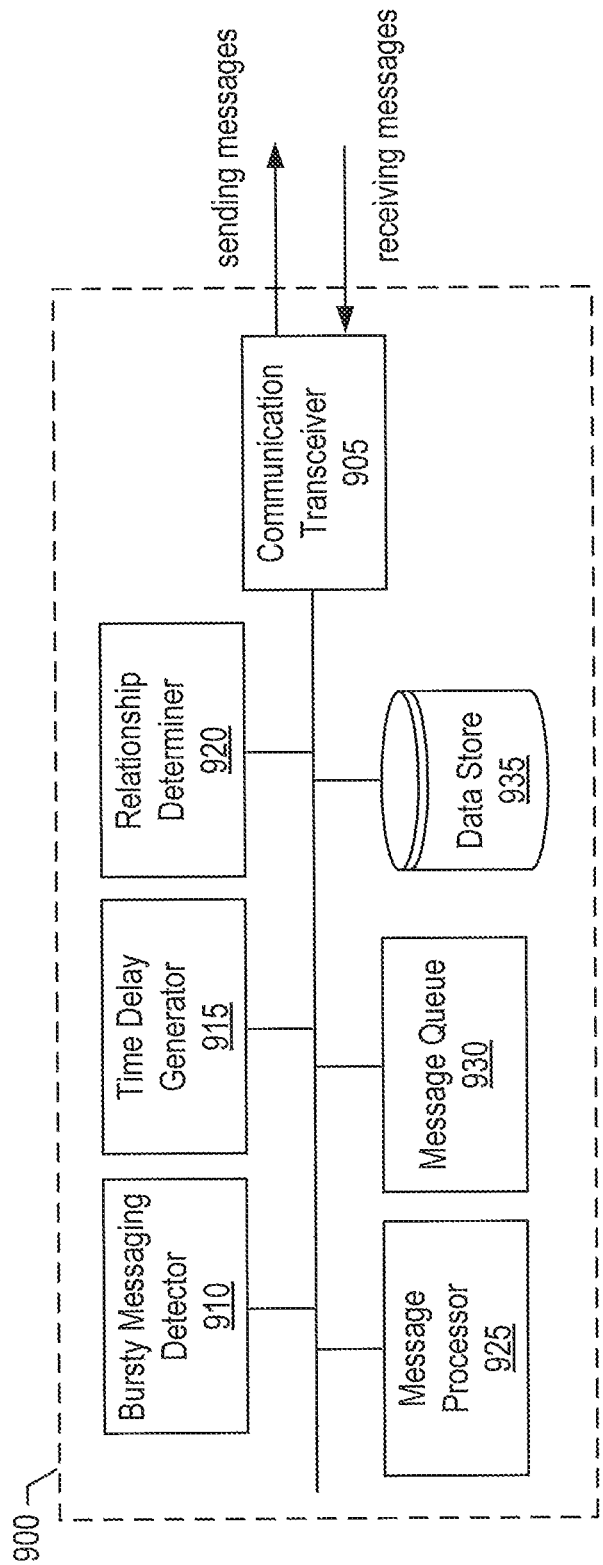
FIG. 9 illustrates a block diagram of an example of a network device in accordance with one or more embodiments of the present disclosure.

FIG. 9 illustrates a block diagram of an example of a network device 900 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

In an embodiment, the network device 900 may be any device that can receive messages from and/or transmit messages to another device. In an embodiment, the network device 900 may be one of the servers 110A-C, one of the base stations 210A-C, one of the components of the PCC architecture 215, or one of the components of the external network(s) 220. Although the network device 900 can be utilized as a receiver device and a sender device, a network device may be exclusively a receiver device or exclusively a sender device.

The network device 900 includes a communication transceiver 905, bursty messaging detector 910, time delay generator 915, relationship determiner 920, message processor 925, message queue 930, and data store 935. The communication transceiver 905 may implement appropriate physical layer(s) and protocol stack(s) to enable communication between the network device 900 and one or more other devices. As one example, the communication transceiver 905 may include an LTE transceiver module for implementing an LTE physical layer and LTE protocol stack, and/or any other 3G, 4G, and/or 5G transceiver module(s), and/or satellite network transceiver module(s), and/or other transceiver module(s) associated with other wireless protocols/applications. The communication transceiver 905 may allow the network device 900 to transmit messages to and/or receive messages from one or more devices via one or more antennas of the network device 900.

The bursty messaging detector 910 may monitor incoming and outgoing traffic of the network device 900. For example, the bursty messaging detector 910 may determine (e.g., in real-time) a message rate and a miss rate associated with incoming messages and outgoing messages. The bursty messaging detector 910 may cause a receiver port of the network device 900 to transition to a bursty traffic mode when the receiver port has a miss rate above a threshold miss rate, such as when the receiver port is unable to process at least some messages received by the receiver port (e.g., a non-zero miss rate). The bursty messaging detector 910 may cause a transmitter port of the network device 900 to transition to a bursty traffic mode when the transmitter port is associated with a miss rate above a threshold miss rate, such as when a receiver device of messages transmitted by the network device 900 is unable to process at least some of the messages transmitted by the network device 900.

The time delay generator 915 may determine a time delay based on a message rate and a miss rate. For example, the time delay generator 915 may determine the time delay using a relationship provided by the relationship determiner 920 and/or retrieved from the data store 935. The relationship determiner 920 may determine a relationship between the message rate, miss rate, and time delay. In some cases, the relationship may be a relationship between the message rate and the time delay such that miss rate is minimized (e.g., in some cases, zero miss rate). To determine the relationship, the relationship determiner 920 may receive the message rate and miss rate from the bursty messaging detector 910 and the time delay from the time delay generator 915 for multiple sets of data.

The message processor 925 may process messages received by the network device 900 on its receiver-side and may provide messages for transmission on its transmitter-side. On the receiver-side, in a case that the network device 900 is the PCRF 225, the network device 900 may receive messages from the PCEF 245 to be processed. For example, the network device 900 may receive messages associated with UE requests and transmit messages containing policy decisions to the PCEF 245. On the transmitter-side, the message processor 925 may generate messages of an appropriate format for transmission to an intended receiver device. The message processor 925 may receive, from the time delay generator 915, one or more time delays to be applied to received messages and/or messages to be transmitted. In case that the network device 900 has multiple receiver-ports and/or multiple transmitter-ports, each receiver port and each transmitter port may have its own message rate, miss rate, and time delay.

The message queue 930 may store messages to be processed by the message processor 925 and/or messages to be transmitted. The data store 935 may store data to facilitate operation of the network device 900. In some cases, the data store 935 may store data to facilitate time-spaced data communications. For example, the data store 935 may store data indicative of the relationship between the message rate, miss rate, and time delay (e.g., stored as one or more equations and/or as one or more lookup tables).

Figure 10:
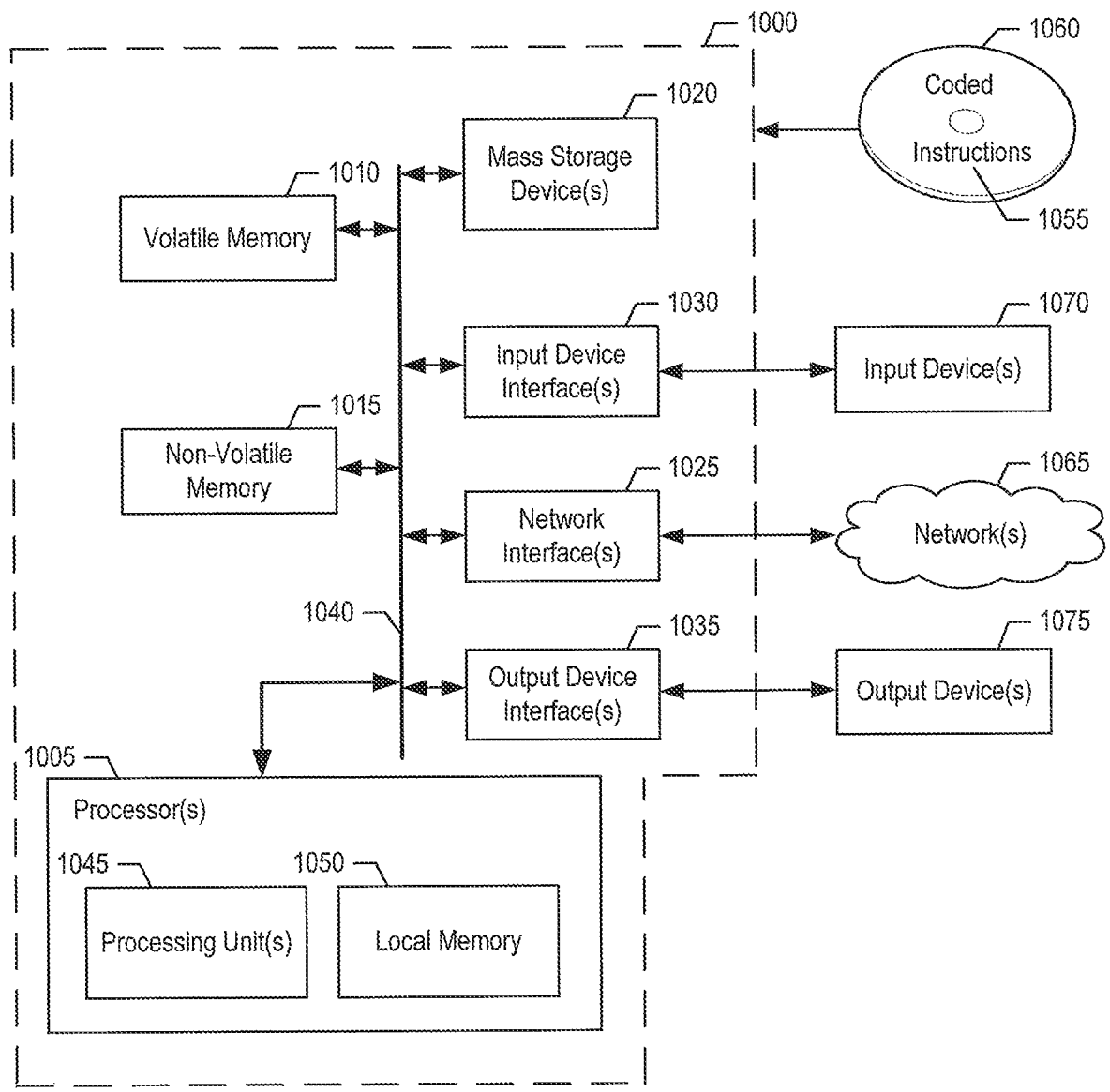
FIG. 10 illustrates a block diagram of an example of an electronic system with which one or more embodiments of the present disclosure may be implemented.

FIG. 10 illustrates a block diagram of an example of an electronic system 1000 with which one or more embodiments of the present disclosure may be implemented. In an embodiment, the electronic system 1000 may be, may include, or may be referred to as, processor platform. The electronic system 1000 can generally be any type of computing device. In an embodiment, the electronic system 1000 can be, can include, and/or can be a part of, one or more of the user devices 105A-D and/or 205A-C, servers 110A-C, network 115, base stations 210A-C, components of the PCC architecture 215, components of the external network(s) 220, and network device 900 shown in FIGS. 1, 2, and 9, and/or components thereof (e.g., PCEF 245).

The electronic system 1000 includes one or more processors 1005, volatile memory 1010, non-volatile memory 1015, one or more mass storage devices 1020, one or more network interfaces 1025, one or more input device interfaces 1030, one or more output device interfaces 1035, and a link 1040. The link 1040 may be, may include, or may be implemented by, a bus, one or more point-to-point connections (e.g., intra-chip connections and/or inter-chip connections), and/or other connections for facilitating connection of and/or communication between various components of the electronic system 1000.

The link 1040 couples (e.g., connects) to the processor(s) 1005. In an aspect, the processor(s) 1005 of the illustrated example is hardware. For example, the processor(s) 1005 can be implemented by one or more integrated circuits, logic circuits, processors, and/or controllers from any desired family or manufacturer. The processor(s) 1005 includes one or more processing units 1045 configured via instructions 1055 stored in a local memory 1050 (e.g., a cache) of the processor(s) 1005. In an aspect, the instructions 1055 may include instructions that when executed, perform at least some instructions of FIGS. 3-8. The processor(s) 1005 is in communication with the volatile memory 1010, non-volatile memory 1015, and the mass storage device(s) 1020 via the link 1040.

The link 1040 couples (e.g., connects) to the volatile memory 1010, non-volatile memory 1015, and mass storage device(s) 1020. The volatile memory 1010 may include synchronous dynamic RAM (SDRAM), dynamic RAM (DRAM), static RAM (SRAM) Rambus dynamic RAM (RDRAM), and/or other types of volatile memory. The non-volatile memory 1015 may include read-only memory (ROM), programmable ROM (PROM), erasable programmable ROM (EPROM), electrically erasable programmable ROM (EEPROM), flash memory, non-volatile RAM (NVRAM), and/or other types of non-volatile memory. The non-volatile memory 1015 may store instructions and data even when the electronic system 1000 is off. The mass storage device(s) 1020 may include floppy disk drives, hard disk drives, compact disk drives, DVD drives, Blu-ray Disc™ drives, redundant array of independent disks (RAID) systems, solid state memories, and/or other devices that allow storage. Access to the volatile memory 1010, non-volatile memory 1015, and mass storage device(s) 1020 may be controlled by a memory controller (not shown). In an aspect, the coded instructions 1055 corresponding to at least some instructions of FIGS. 3-8 may be stored in the volatile memory 1010, non-volatile memory 1015, mass storage device(s) 1020, local memory 1050, and/or on a removable tangible computer readable storage medium, such as a disk 1060 (e.g., CD, DVD, or Blu-ray Disc™).

The link 1040 couples (e.g., connects) to the network interface(s) 1025. The network interface(s) 1025 may couple the electronic system 1000 to one or more networks 1065. In this manner, the electronic system 1000 can be a part of a network of devices, such as a LAN, a WAN, or an Intranet, or a network of networks, such as the Internet. In an embodiment, the network interface(s) 1025 may facilitate communication between the electronic system 1000 and a cellular network, such as a cellular network that includes the network 115 of FIG. 1. The network interface(s) 1025 may be implemented by any type of interface standard, such as an Ethernet interface, a USB interface, a PCI express interface, a wireless network interface (e.g., wireless LAN interface), a cellular network interface, and/or other interfaces. For example, a cellular network interface may provide support for GSM-based cellular networks, code division multiple access (CDMA)-based cellular networks, and/or other cellular networks. The network interface(s) 1025 may include a communication device such as a transmitter, receiver, transceiver, modem, and/or network interface card to facilitate exchange of data with external machines (e.g., computing devices of any kind) via the network(s) 1065.

The link 1040 couples (e.g., connects) to the input device interface(s) 1030. The input device interface(s) 1030 may couple the electronic system 1000 to one or more input devices 1070. The input device(s) 1070 may enable a user to provide (e.g., enter) data and commands to the electronic system 1000. The input device(s) 1070 may include, for example, an audio sensor, a microphone, a camera (still or video), a voice recognition system, a keyboard (e.g., a physical or virtual keyboard), a cursor control device (e.g., a mouse), a touchscreen, and/or other devices for providing user input to the electronic system 1000. Also, many systems, such as the electronic system 1000, can allow a user to provide data and commands using physical gestures, such as, but not limited to, hand or body movements, facial expressions, and face recognition. In this regard, the user input may be received in any form, such as audio (e.g., speech), visual, and/or tactile.

The link 1040 couples (e.g., connects) to the output device interface(s) 1035. The output device interface(s) 1035 may couple the electronic system 1000 to one or more output devices 1075. The output device interface(s) 1035 may include a graphics and/or audio driver card, graphics and/or audio driver chip, and/or graphics and/or audio driver processor. The output device(s) 1075 may enable the electronic system 1000 to provide output information to a user. The output device(s) 1075 may include, for example, display devices (e.g., a light emitting diode (LED), an organic LED (OLED), a liquid crystal display (LCD)), audio devices (e.g., speakers), audiovisual devices, and/or other output devices. In this regard, the output information may provide feedback to the user in any form, such as visual feedback, auditory feedback, and/or tactile feedback.

In one or more embodiments, FIGS. 3-8 illustrate example machine readable instructions for the electronic system 1000. In these examples, the machine readable instructions may include one or more programs for execution by one or more processors, such as the processor(s) 1005 shown in the electronic system 1000. The one or more programs, or portion(s) thereof, may be embodied in software stored on a tangible computer readable storage medium, such as a compact disk (CD), a floppy disk, a hard drive, a digital versatile disk (DVD), a Blu-ray Disc™, and/or other storage device/disk storing the software and/or firmware associated with the processor(s) 1005, but the entire program or programs and/or portions thereof may alternatively be executed by a device other than the processor(s) 1005, and/or embodied in firmware or dedicated hardware (e.g., implemented by one or more analog and/or digital circuit, application specific integrated circuits (ASICs), programmable logic devices (PLDs), and/or field programmable logic devices (FPLDs), discrete logic, etc.). Further, although the example program(s) is described with reference to the flow diagram illustrated in FIGS. 3-8, many other methods may be used. For example, with reference to the flow diagrams illustrated in FIGS. 3-8, the order of execution of the blocks may be changed, and/or some of the blocks described may be changed, removed, combined, and/or subdivided into multiple blocks.

The example processes 300, 400, 500, 600, 700, and 800 of FIGS. 3, 4, 5, 6, 7, and 8, respectively, may be implemented using coded instructions (e.g., computer and/or machine readable instructions) stored on a tangible computer readable storage medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). Alternatively or in addition, the example processes 300, 400, 500, 600, 700, and 800 of FIGS. 3, 4, 5, 6, 7, and 8, respectively, may be implemented using coded instructions (e.g., computer and/or machine readable instructions) stored on a non-transitory computer and/or machine readable medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). As used herein, the terms "tangible computer readable storage medium" and "non-transitory computer readable medium" are expressly defined to include any type of computer readable storage device and/or storage disk and to exclude propagating signals and to exclude transmission media. As used herein, "tangible computer readable storage medium" and "tangible machine readable storage medium" are used interchangeably.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of the present disclosure is not limited to such standards and protocols. For instance, each of the standards for Internet and other packet switched network transmission (e.g., Transmission Control Protocol (TCP)/Internet Protocol (IP), User Datagram Protocol (UDP)/IP, Hypertext Markup Language (HTML), Hypertext Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by the present disclosure and are intended to be included within the scope of the accompanying claims.

Additionally, although embodiments of the present disclosure provide example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware, and/or software. Accordingly, while the foregoing provides example systems, methods, and articles of manufacture, the examples are not the only way to implement such systems, methods, and articles of manufacture. Therefore, although certain example methods, apparatus, and articles of manufacture have been described herein, the scope of coverage of the present disclosure is not limited thereto. On the contrary, the present disclosure covers all methods, apparatus, and articles of manufacture fairly falling within the scope of the claims either literally or under the doctrine of equivalents.

What is claimed is:

1. A method, comprising:
   generating, by a network device comprising a processor, a relationship model defining a function of a relationship parameter vector, time delay, miss rate, and message rate, based on respective time delays, respective message rates, and respective miss rates of first groups of messages communicated via a network; and
   in response to determining that a miss rate, of a second group of messages communicated on the network, exceeds a threshold miss rate:
      determining, by the network device, a time delay based on the relationship model, the miss rate, and a message rate of the second group of messages, and
      applying, by the network device, the time delay to a message communicated subsequent to the second group of messages.

2. The method of claim 1, further comprising adjusting, by the network device, the relationship parameter vector based on a third group of messages communicated via the network subsequent to the second group of messages, resulting in an adjusted relationship parameter vector; and
   updating, by the network device, the relationship model based on the adjusted relationship parameter vector.

3. The method of claim 2, wherein the adjusting occurs in response to a change in a performance metric applicable to the network.

4. The method of claim 2, wherein the adjusting occurs periodically.

5. The method of claim 1, wherein the relationship parameter vector comprises a first relationship parameter associated with time delay, and a second relationship parameter associated with message rate.

6. The method of claim 1, wherein the first groups of messages are sent by the network device via the network.

7. The method of claim 1, wherein the first groups of messages are received by the network device via the network.

8. Network equipment, comprising:
   a processor; and
   a memory that stores executable instructions that, when executed by the processor, facilitate performance of operations, comprising:
      determining a relationship among relationship parameters, time delay, miss rate, and message rate, based on respective time delays, respective message rates, and respective miss rates of first groups of messages transmitted on a network; and
      in response to determining that a miss rate, of a second group of messages transmitted via the network, exceeds a threshold miss rate:
         determining a time delay based on the relationship, the miss rate, and a message rate of the second group of messages, and
         applying the time delay to a message transmitted subsequent to the second group of messages.

9. The network equipment of claim 8, wherein the operations further comprise adjusting the relationship parameters based on a third group of messages transmitted via the network subsequent to the second group of messages.

10. The network equipment of claim 9, wherein the adjusting occurs in response to a measured reduction in performance of the network.

11. The network equipment of claim 9, wherein the adjusting occurs at predefined intervals.

12. The network equipment of claim 8, wherein the relationship parameters comprise a first relationship parameter associated with time delay, and a second relationship parameter associated with message rate.

13. The network equipment of claim 8, wherein the first groups of messages are sent by the network equipment.

14. The network equipment of claim 8, wherein the first groups of messages are received by the network equipment.

15. A non-transitory machine-readable medium, comprising executable instructions that, when executed by a processor, facilitate performance of operations, comprising:
    determining a model that defines a function of relationship coefficients, time delay, miss rate, and message rate, based on respective time delays, respective message rates, and respective miss rates of first groups of network messages sent; and
    in response to determining that a miss rate of a second group of network messages exceeds a threshold miss rate:
       determining a time delay based on the model, the miss rate, and a message rate of the second group of and messages, and
       applying the first time delay to a and message sent subsequent to the second group of and messages.

16. The non-transitory machine-readable medium of claim 15, wherein the operations further comprise adjusting the relationship coefficients based on a third group of network messages sent subsequent to the second group of network messages.

17. The non-transitory machine-readable medium of claim 16, wherein the adjusting occurs in response to a change in performance of the network.

18. The non-transitory machine-readable medium of claim 16, wherein the adjusting occurs at predefined intervals.

19. The non-transitory machine-readable medium of claim 15, wherein the relationship coefficients comprise a time delay relationship coefficient, and a message rate relationship coefficient.

20. The non-transitory machine-readable medium of claim 15, wherein the first groups of network messages were sent from respective user equipment.

* * * * *